(12) United States Patent
Parsons et al.

(10) Patent No.: US 11,973,651 B1
(45) Date of Patent: Apr. 30, 2024

(54) ENHANCED HIERARCHICAL NETWORK AUTOMATION

(71) Applicant: MICROSOFT TECHNOLOGY LICENSING, LLC, Redmond, WA (US)

(72) Inventors: James Duncan Parsons, Enfield (GB); Peter Louis White, Edinburgh (GB); Sunniva Rose Carter, Enfield (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/335,863

(22) Filed: Jun. 15, 2023

(51) Int. Cl.
*H04L 41/0894* (2022.01)
*H04L 41/082* (2022.01)

(52) U.S. Cl.
CPC ........ *H04L 41/0894* (2022.05); *H04L 41/082* (2013.01)

(58) Field of Classification Search
CPC ................................ H04L 67/34; H04L 67/50
See application file for complete search history.

(56) References Cited

U.S. PATENT DOCUMENTS

| | | | | |
|---|---|---|---|---|
| 9,990,228 B1* | 6/2018 | Jayanthi | .................. | G06F 9/455 |
| 2012/0311568 A1* | 12/2012 | Jansen | ................ | G06F 9/45558 |
| | | | | 718/1 |
| 2015/0195128 A1* | 7/2015 | Kim | .................... | G06F 9/45558 |
| | | | | 709/220 |
| 2019/0104182 A1* | 4/2019 | Elzur | .................... | H04L 67/125 |
| 2019/0222988 A1* | 7/2019 | Maes | ...................... | H04L 67/10 |

* cited by examiner

*Primary Examiner* — Clayton R Williams
(74) *Attorney, Agent, or Firm* — Scott Y. Shigeta; Newport IP, LLC

(57) ABSTRACT

The system described herein provides a method for deploying, managing, scaling, configuring, upgrading, and modifying large complicated systems that are made-up of many different network resources. These network resources may be virtual machines or containers. The system constructs a hierarchical SNS by building up layers from the inside of an outer SNS. The system conducts health checks at each layer to ensure the system is properly functioning and the deployment is healthy. Lastly, third party vendors input logic in each layer to identify a desired state for the system. Once the desired state is identified, each layer can determine the necessary actions to upgrade from the current state to the desired state. This system simplifies, adds efficiency, and increases security when deploying, scaling, configuring, upgrading, or modifying the system.

20 Claims, 14 Drawing Sheets

Upgrade example: a major modification that updates network functionality
Initial State: prior to modification to the outer CGV Upgrade example: a major modification that updates network functionality
Intermediate State: both downlevel and uplevel co-exist

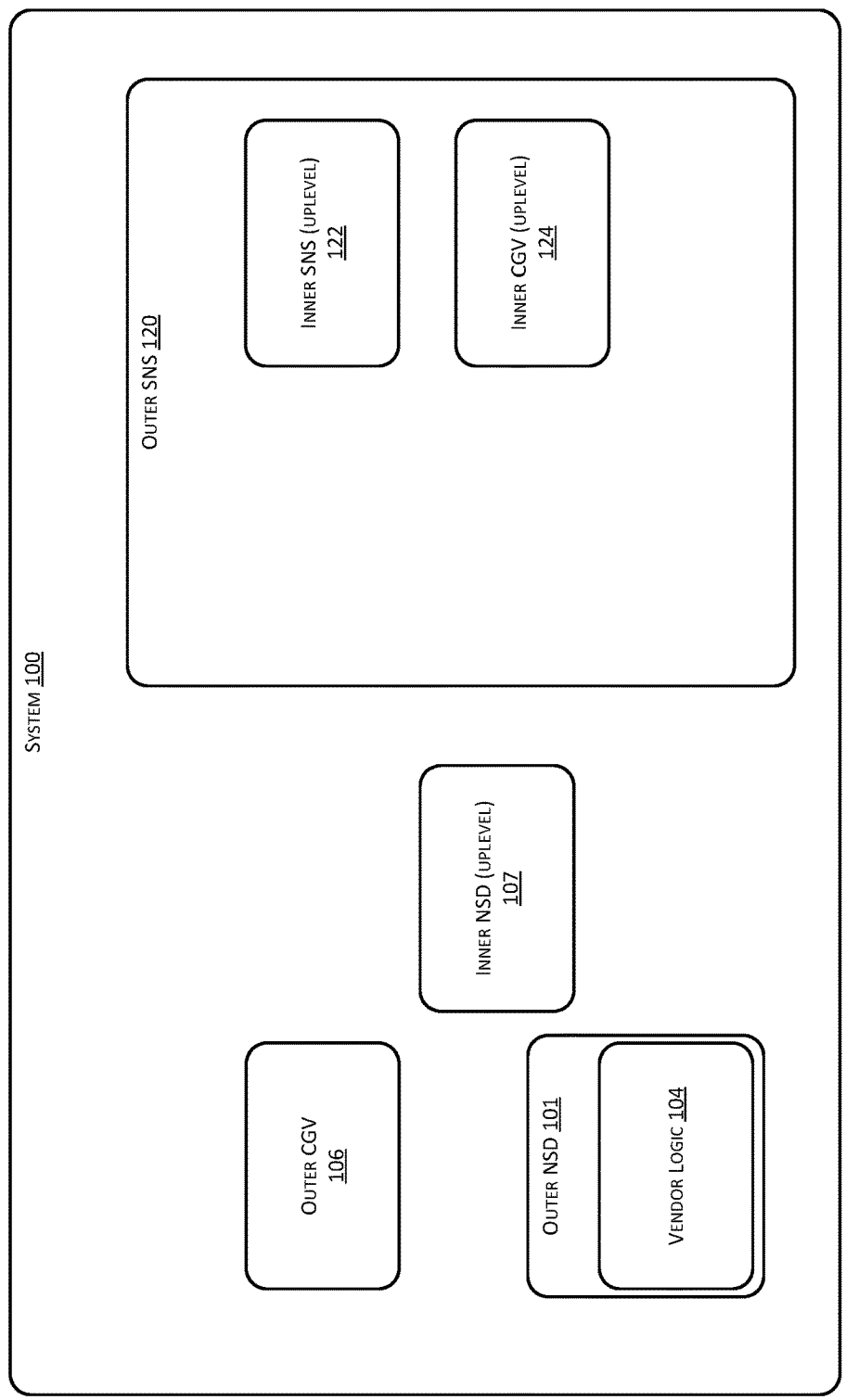

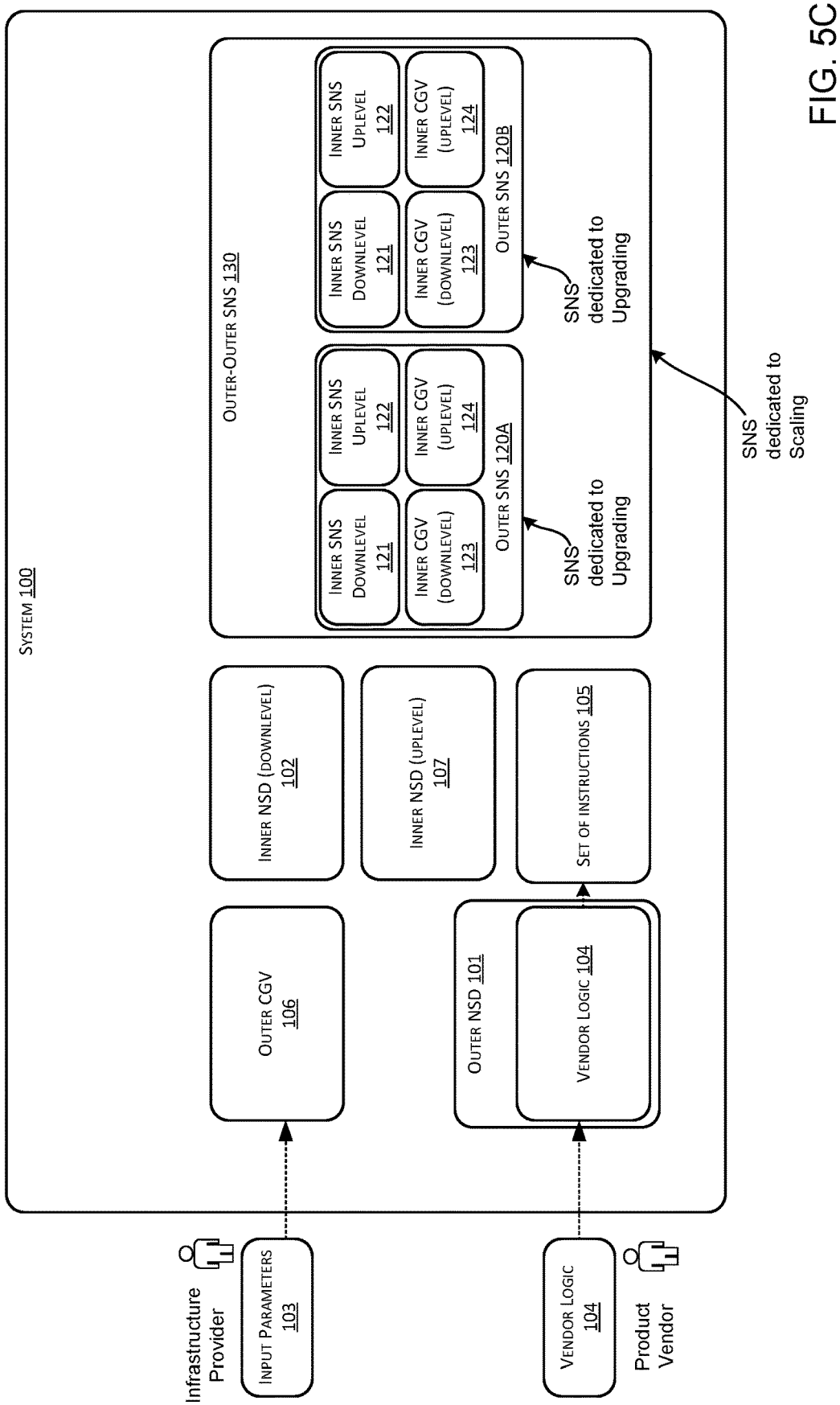

ENHANCED HIERARCHICAL NETWORK AUTOMATION

BACKGROUND

Managing network functions, such as virtual machines (VM) and containers, can be challenging. For example, consider a scenario involving an upgrade on a system that provides containers that run on Kubernetes clusters. An upgrade can generally be performed in two ways. In one example, if an upgrade is just a change to a helm chart, then the upgrade can be achieved with a helm update. However, in another example, if the underlying infrastructure needs to change, such as an upgrade of the underlying cluster, then a manual "replace and delete" process is required. That process can include a number of tedious, manual, steps, such as deploying new uplevel cluster, installing a new uplevel application on the cluster, performing a health check on the uplevel application, changing the DNS record such that traffic is redirected to the uplevel application. Then the process requires a user to wait for several days. This wait can last up to a week to allow proper diagnostics in a situation where a database is used in a downlevel application cluster. Although a system can confirm that an uplevel application cluster is working as soon as it is spun up, and at that point all new diagnostic traffic gets sent to the uplevel application, the downlevel application still needs to be in place so that searches can be conducted over old data. Only after that time, an administrator can manually delete the down-level application and corresponding cluster. With such a long, manual process, a number of errors and inefficiencies are introduced.

In another example, consider a scenario where a system utilizes ARM templates. ARM templates can include JSON files that define details of a deployment of an infrastructure-as-code solution on a system. When a system relies on ARM templates, the system is limited to simple updates. The issue is that there are many types of updates and deployments that are required for network functions that are not possible to do with ARM templates. Therefore, in more complex updates, some existing systems are required to delete an entire deployment, an action that causes an outage, and then redeploy a new set of network functions. This is not a scenario that can be done for certain systems, such as systems that are part of a national infrastructure, like telecom systems. Outages are simply not an option, and more particularly for national infrastructure systems, prolonged outages.

In yet another example, when it comes to telecom companies managing a Public Switched Telephone Network (PSTN), the above-described issues present additional complications. For illustrative purposes, consider a scenario where an infrastructure provider, such as a telecom company like AT&T, wants to build a new network that includes several different groups of network functions that are from different product vendors, such as Microsoft, Ericsson, Nokia, etc. In this scenario, each product vendor provides their own version of network functions. If an infrastructure provider has to create manual processes to manage network functions from a number of different product vendors, they would have to spend a considerable amount of time and resources developing and maintaining those procedures. This can lead to a number of design errors and inadvertent inputs caused by human error. These errors can ultimately lead to security and reliability issues. Further, given the development costs for writing manual procedures for each new network function and for each product vendor, the traditional manual configuration methods are also not scalable.

The traditional manual configuration methods may also impact the efficiency of a system. If an infrastructure provider were to use a manual approach to writing the logic for managing network functions, this scenario may influence an infrastructure provider to only select network functions from a single product vendor or use a reduced set of product vendors. Although this approach may lead to more efficient processes for writing and managing the procedures, this approach may lead to a design paradigm that limits the diversity of available network functions and product vendors.

It is with respect to these and other technical challenges that the disclosure made herein is presented.

SUMMARY

The techniques disclosed herein provide enhanced hierarchical network automation. The disclosed techniques can deploy, configure, and upgrade complicated systems that are made-up of different network functions, such as virtual machines, containers running on a Kubernetes cluster, plus all of the infrastructure structure that ties those functions together. By the use of hierarchical site network services (SNS), also referred to herein as "network services" or "services," the disclosed techniques provide an approach to building a hierarchy with small, more simplistic service structures in the middle and then being able to put several of those service structures inside a more complicated service, and then build up layers of more complicated components, such as SNS components. When an inner SNS object is to be replaced, the system can generate a new SNS object that concurrently operates in parallel with the original inner SNS object. As described in more detail below, this coordination between the original SNS and a new SNS objects can increase the reliability of a system while minimizing or eliminating system outages. The disclosed techniques also provide automated health checks. As described in more detail below, a system is configured in a way that can determine if each of the services are healthy, determine if each of the layers are healthy, and also determine if a group of services is healthy. This enables a layered approach to determining if an entire deployment is healthy. In addition, the disclosed techniques introduce logic in each of the layers. The logic can interpret parameters defining a desired state of where a system should be, and the logic can provide an automated method of determining a current state, e.g., an initial state, of the system. The logic can also generate instructions that enable each layer to transition from the current state to the desired state.

In one illustrative example, the system starts with an original set of network functions and the system is configured in a way that those network functions can be changed in whatever way a network function provider wants. The network function provider can either (1) invoke a simple update or (2) replace individual resources within that network function. The first type of modification involves relatively straightforward modifications to parameters, such as a helm update. The second type of modification can involve replacing a VM or a container, or replacing the entire network function with something else. The disclosed techniques allow the system, or the network function provider, to determine how each of those changes are done. The system can determine if a simplistic method is to be used, e.g., a helm update, or if a more complex method using logic of a hierarchical structure is to be used. In one example, the hierarchical structure has an outer level and an inner level. The logic of the outer level can make a number of determinations including determining a category of modifications, e.g., is a modification a major modification or a minor modification. The logic of the outer level can also determine the health of the network functions. The logic of the outer level can also cause the inner level of the system to transition from a current state to a desired state.

The system also provides abstraction at each of the layers. This abstraction and other supporting functionality enable an infrastructure provider, such as a telecom company, to make major modifications to a system without having to develop the logic for each of the network functions supported by different providers. This is achieved by a system that is configured to receive vendor logic having imperative code from one party, e.g., a product vendor supporting specific network functions; and more general instructions, such as declarative code, from another party, e.g., an infrastructure provider. This allows the infrastructure provider to use simplified instructions that focus on the result of what is needed, while leveraging the imperative logic having the explicit sequence of commands that is provided by the product vendor that already has knowledge of each function.

For illustrative purposes, consider a scenario where an infrastructure provider, such as a telecom company like AT&T, wants to build a new network that includes several different groups of network functions that are from different product vendors, such as Microsoft, Ericsson, Nokia, etc. If the infrastructure provider uses traditional methods, they would have to know details of how to code each of the network functions from each of the product vendors. However, by the use of the disclosed system, the system can receive logic, e.g., the imperative code, from each of the product vendors, and allow the infrastructure provider to use simplified parameters, e.g., declarative code, defining a desired state of a system. This is greatly beneficial to the infrastructure provider since the system allows them to leverage the detailed knowledge of the respective network functions from each product vendor (also referred to herein as a "network function provider" or "network function vendor").

The vendor logic (also referred to herein as "logic") is the set instructions for a particular network function (NF). The vendor logic can have instructions that can bring a system from a current state (also referred to herein as an "original state" or an "initial state") to a desired state. The logic can include, but is not limited to, operations for modifying, upgrading, downgrading, installing, or removing network functions. The vendor logic can also have the operations necessary for interpreting a current state of a system and desired state of the system. The logic can also perform the operations necessary, or generate additional code or instructions, for transitioning the system from the current state to the desired state.

The logic can be written by the network function vendor. This is helpful because the team that produced the cluster already has knowledge of the right way to conduct an upgrade, the parameters and timing of health checks, the timing and parameters to change DNS records, etc. For example, some network functions need to change the DNS record, while other network functions may not need to change the DNS record. In another example, a particular network function may require a system reboot, while other particular network functions may not require a system reboot. Ultimately, the logic for upgrading or configuring particular network functions might be an entirely different set of actions when compared to network functions for another vendor, thus it is difficult for one party to write the logic for network functions that are managed and designed by another party. The system enables each vendor to provide logic for their respective products.

Since the system empowers each product vendor to provide the logic with their own network function modules, each vendor control specific customizations and updates. This helps with reliability and efficiency as they do not have to rely on another party, e.g., the infrastructure provider, to manage code that controls the performance of their network functions. Additional efficiency and reliability are achieved since the infrastructure provider designing their network does not need to understand the detailed aspects of each network function, provided by each product vendor. For example, a network service design (NSD) that's supplied by Ericsson can include all of that logic built into it. In general, an NSD can define a desired deployment and that design is parameterized by config group values. For example, an NSD can define parameters for a virtual machine or a container having a particular type of function. This allows the infrastructure provider, such as AT&T, to have the ability to provide simplified instructions, such as upgrade the Erickson NF by one version level, add a database, increase the capacity of a database by particular quantity, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 3D illustrates a fourth phase of a system having a hierarchical structure to upgrade network resources based on third party vendor logic.

FIG. 5C illustrates a third phase of a system having an embedded hierarchical structure to upgrade network resources that have been scaled based on third party vendor logic.

DETAILED DESCRIPTION

The techniques described herein implement a method for deploying, managing, scaling, configuring, upgrading, and modifying large complicated systems comprising different network resources. These network resources may be virtual machines or containers. The system includes a hierarchical SNS structure that includes inner SNS modules that are part of an outer SNS structure. The system also runs health checks at each layer to ensure the system is functioning properly during the transition from an initial state to a desired state. The system can also use third-party vendor input logic to interpret a configuration change to identify a desired state, query data to determine a current state, and cause a transition from the current state to the desired state. This can allow a party, such as an infrastructure provider, to provide simplified instructions, such as system parameters, to modify the state of a system. This system simplifies, adds efficiency, and increases security when deploying, scaling, configuring, upgrading, or modifying network functions of the system.

As shown in FIGURES, the system includes a hierarchy that includes an outer SNS 120 that contains multiple inner SNS 121 modules. The inner SNS, for example, can deploy a single network function (NF). The system also includes network service design (NSD). An NSD can define a desired deployment, and that design is parameterized by config group values (CGV). An NSD is similar to an ARM template and its corresponding parameters or a helm chart and the parameters for a helm chart. In this example, there is an inner NSD 102, which can define deploying, for example, a single NF. The system is configured such that the outer NSD 101 contains and manages the vendor logic 104. In addition, there is an outer NSD 101, which can deploy the inner SNS corresponding to the inner NSD. The outer NSD 101 can also deploy additional infrastructure around the inner SNS 121. Also shown, the system 100 can receive input parameters 103 from a first party, such as an infrastructure provider. The input parameters 103 define a desired state of the system, and the system leverages vendor logic 104 provided by a product vendor to transition the system from a current state to the desired state.

Figure 1A:
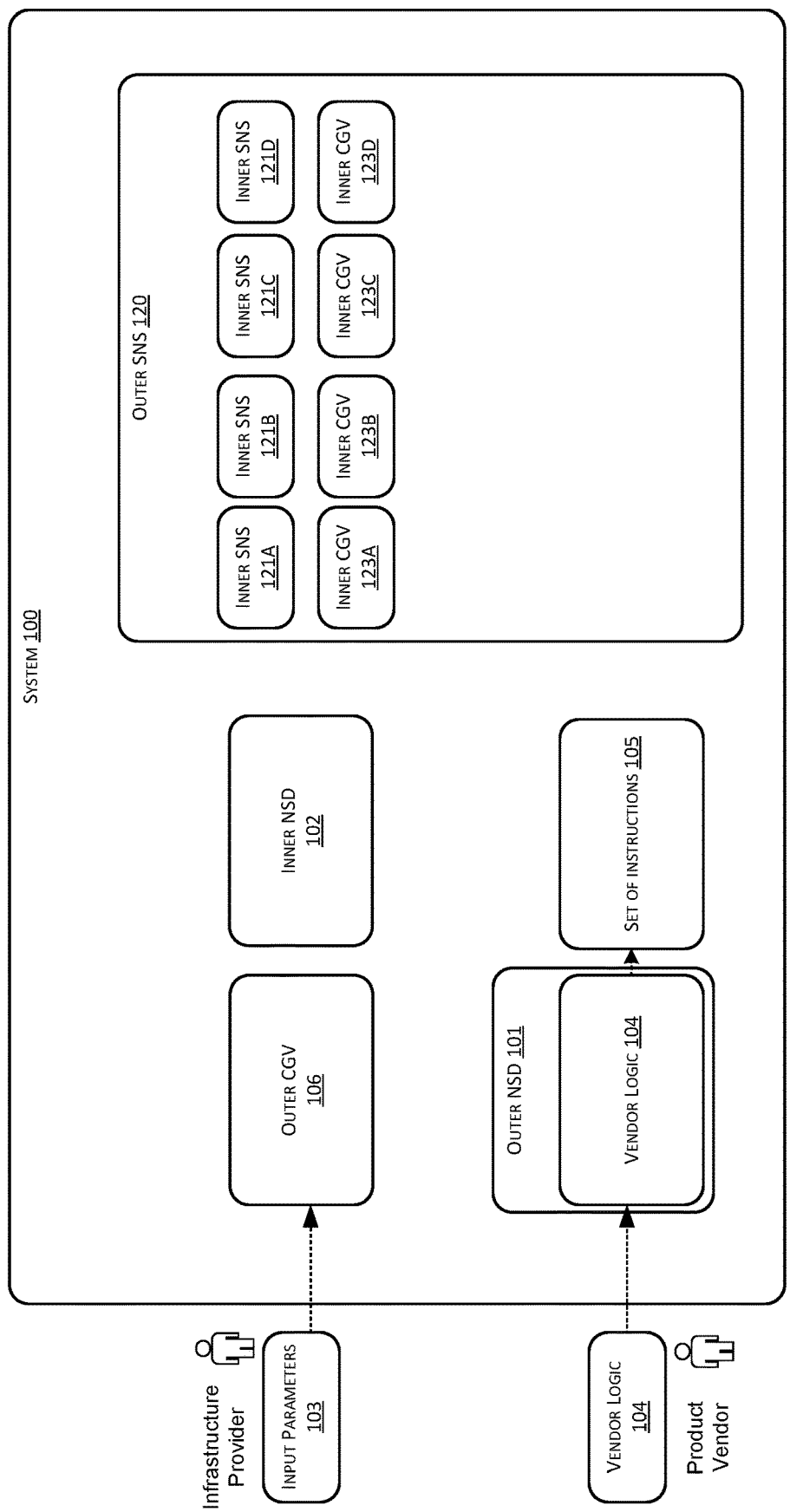
FIG. 1A illustrates a first phase of a system having a hierarchical structure to scale network resources based on third party vendor logic.
Figure 1B:
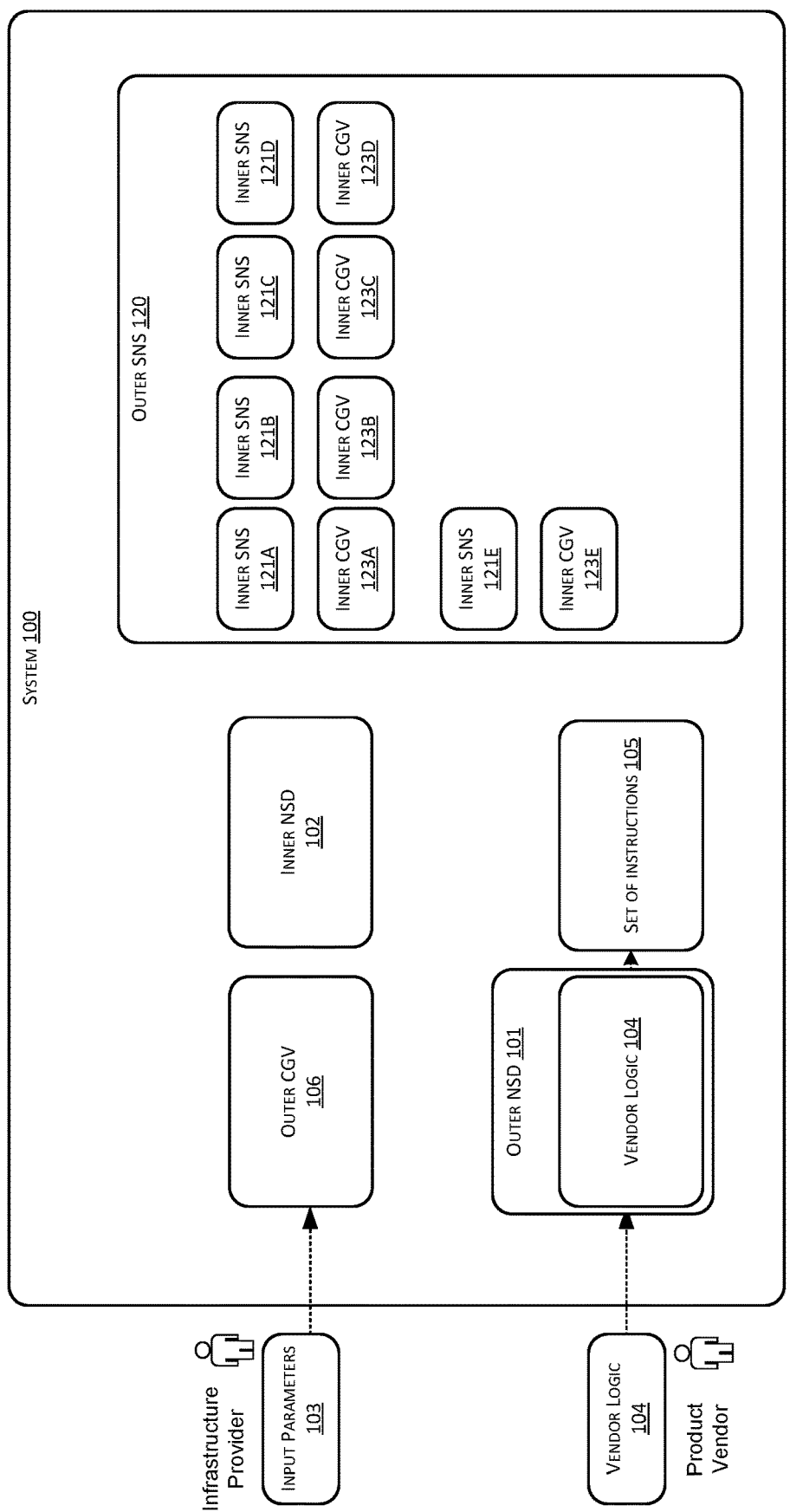
FIG. 1B illustrates a second phase of a system having a hierarchical structure to scale network resources based on third party vendor logic.
Figure 2:
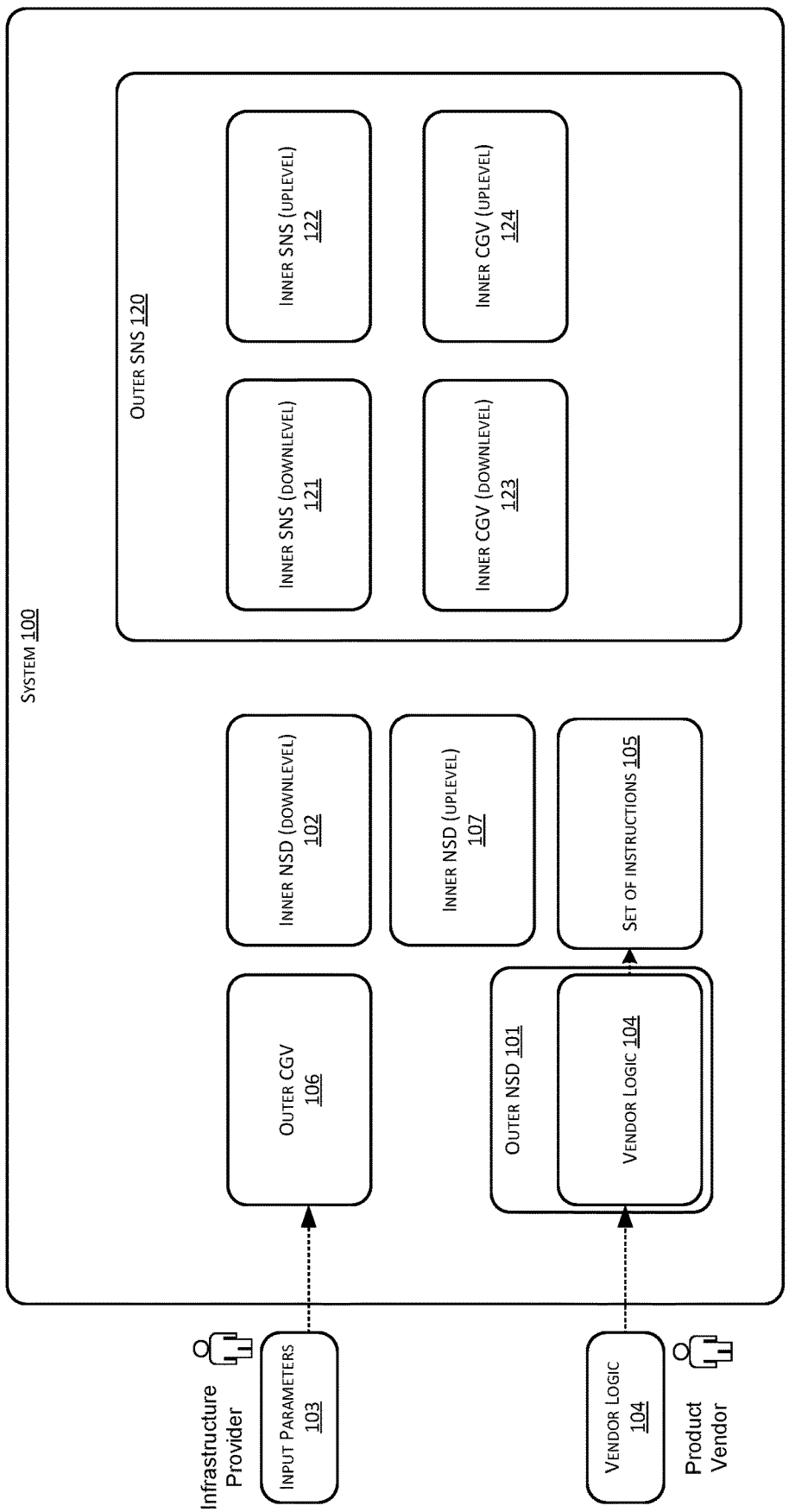
FIG. 2 illustrates an example of a system that can use third-party vendor logic to upgrade a system.

For illustrative purposes, the following examples show two different types of upgrades that might need to be done: (1) a first type of modification involves a simple adjustment to a helm chart, and (2) a second type of modification involves an infrastructure change. A first process that is used for the first type of modification is shown in FIGS. 1A-1B, and a second process that is used for the second type of modification is shown in FIGS. 2 and 3A-3D. In some embodiments, the system can analyze the input parameters 103 to determine which process should be used to transition the system from the current state to the desired state. As described in the examples below, the first type of modification is used when the input parameters 103 indicate a need for a simple update, such as a helm chart change; and the second type of modification is used when the input parameters 103 indicate a need for a more complex modification, such as, but not limited to, new network function or a major version change of a network function.

In the first example, an adjustment to a helm chart is made. In this case, a change is made to the parameters in the outer configuration group value. That then gets applied to the SNS. In doing that, it changes the config group values for the inner SNS. Then those get applied to ultimately to the helm charts for the containers running on their cluster.

The second example involves an infrastructure change. Consider a scenario where a change is needed for a database schema that is being used. In this situation, an entirely new database is needed, and the old one needs to be removed from the system. In doing so, a major change is made to a version of a network function, e.g., by a major version bump in the outer config group values. Then that gets applied to the outer site network service (outer SNS).

The logic in that outer SNS then identifies that the upgrade is a major upgrade. In response to the identification of the major upgrade, instead of just applying some changes to the containers that are running on the existing cluster, they spin up an entirely parallel cluster with new containers. The DNS records are then changed so that traffic starts going to that new cluster instead of the old cluster. Health checks are then conducted to ensure proper management of the traffic to the new cluster.

Once the data on the old cluster ages out and/or when the health checks are passed, the original containers are then deleted. If the health check does not meet one or more criteria, the original containers are not deleted and further adjustments or another container on a new cluster can be generated.

Referring now to FIGS. 1A and 1, a more detailed example of a minor modification is shown and described below. A minor modification, for example, can involve the addition or deletion of a single network resource, such as a VM. This example also shows an example where a party, e.g., an infrastructure provider, initiates a modification to the system that leverages vendor logic provided by a product vendor managing the desired network functions. As shown, the system 100 includes a hierarchy comprising an outer NSD 101 and an inner NSD 102. For illustrative purposes, the outer NSD 101 is also referred to herein as the "outer layer 101" and the inner NSD 102 is also referred to herein as the "inner layer 102."

With reference to FIG. 1A, consider a scenario where the inner NSD 102 is written by a product vendor, such as Ericsson. The inner NSD 102 can define, for example, the parameters for a virtual machine having a particular type of function. Generally, a product vendor can be any entity managing NSDs and supporting code for specific network functions they provide. On the other hand, the outer NSD 101 is written by another entity functioning as an infrastructure provider, AT&T. The outer NSD 102 can define, for example, a number of VMs they want to use in the system. The infrastructure provider can be an entity managing the system, e.g., infrastructure systems, such as a PSTN.

For a first deployment, the infrastructure provider can choose the NSD they want to use. The infrastructure provider can put the desired state into the outer config group values ("CGV 106") and that will cause the system to deploy the corresponding SNS modules that are based on the outer config group values. For example, these SNS modules can include containers, VMs, networking, and everything else that is needed for operation of the desired network functions.

Then later, when the infrastructure provider wants to make a change, the infrastructure provider will change the outer CGV 106. This change can be a situation where, for example, the infrastructure provider may want to have five VMs instead of four VMs. That change will be applied to the outer SNS. The outer SNS will then use its logic to determine that it is to transition from a current state of four VMs to a desired state of five VMs. The outer SNS will then deploy another inner SNS, which will bring up another VM, in accordance with the updated outer config group values.

The modification to the outer CGV can be initiated by an input at the outer layer. The input can include input parameters 103. In this example, the parameters 103 can simply state five VMs are desired. The parameters 103 are then processed by vendor logic 104. The vendor logic 104 will then generate a set of instructions 105 that are configured to transition the system from the current state to the desired state. Thus, in this example, the vendor logic 104 can perform a query to the system to identify the current state, e.g., there are four VMs, and based on that information, the vendor logic 104 can generate the set of instructions 105 to bring the system to the desired state. These operations may include actions, in this example, deploy one more VM. The operations may also identify parameters of existing VMs and then using those parameters of existing VMs to generate a new VM. So that the logic takes in two things: the desired state of five VMs and it also takes in the current state which indicates that there are four VMs.

Then, as shown in FIG. 1B, the logic then causes the needed actions, which is to deploy one more VM. In this example, the logic would cause the outer SNS 120 to generate an additional inner SNS module 123E for the additional VM. So in this case, before the receipt of the input parameters 103, the outer SNS module contains four inner SNS modules 121A-121D each associated with a VM, and after the processing of the input parameters 103, the outer SNS module would contain five inner SNS modules 121A-121E each associated with one VM. As shown, this process creates a new SNS module 121E and parameters for that new inner SNS, e.g., new inner configuration group values 123E, which are then used to deploy the new VM.

Referring now to FIGS. 2, 3A-3D, a more detailed example of a major modification is shown and described below. An example of a major modification can include a change to the outer CGV 106 indicating a different NSD or an NSD from a different vendor. This can involve input data indicating a change of a pointer in the outer CGV 106 from an old NSD ("inner NSD downlevel 102") to a new NSD ("inner NSD uplevel 107"). In this example, the input data also indicates a new version of a network function, e.g., an upgrade to version 5.

In response to receiving this type of modification to the outer CGV 106, the outer SNS 120 determines that it has version 4 but also acknowledges that it needs version 5. This determination initiates a process where the system generates a new inner SNS ("inner SNS uplevel 122"), version 5 of the network function, and a new inner CGV 124 ("inner CGV downlevel 123"). The system generates these new items such that they run in parallel with the previously existing items, the old inner SNS ("inner SNS downlevel 121"), version 4 of the old network function, and an old inner CGV ("inner CGV downlevel 123").

Similar to the example of FIGS. 1A-1, this embodiment can also utilize logic provided by the product vendor and the input parameters can be provided by another party such as an infrastructure provider. The logic can be used to generate operations to carry out the modification. However, in this embodiment, the logic also includes operations, or causes the generation of operations, that cause all new items, e.g., all uplevel items, to exist in parallel with all downlevel items. This parallel existence enables health checks to be performed while minimizing or eliminating downtime.

Figure 3A:
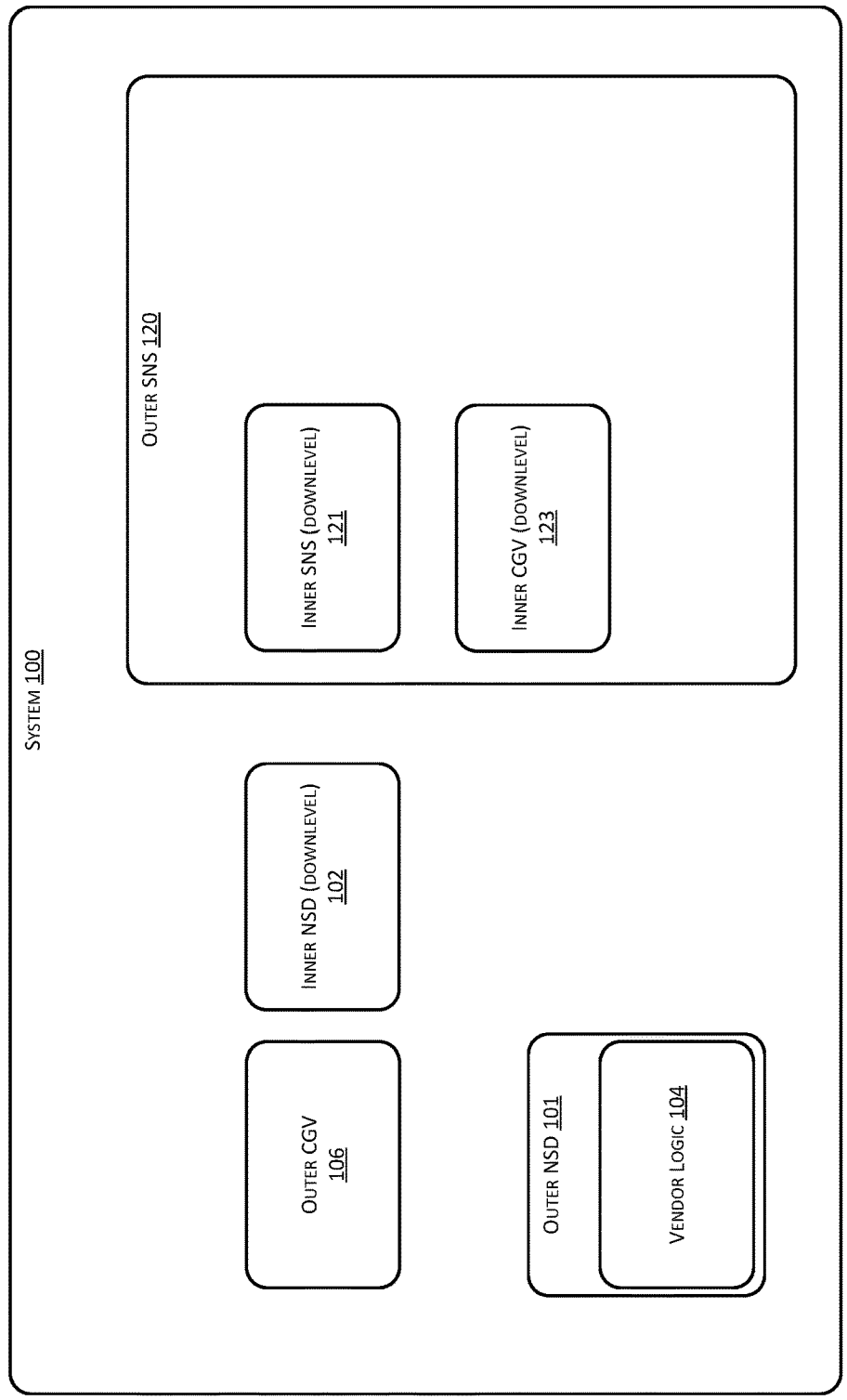
FIG. 3A illustrates a first phase of a system having a hierarchical structure to upgrade network resources based on third party vendor logic.
Figure 3B:
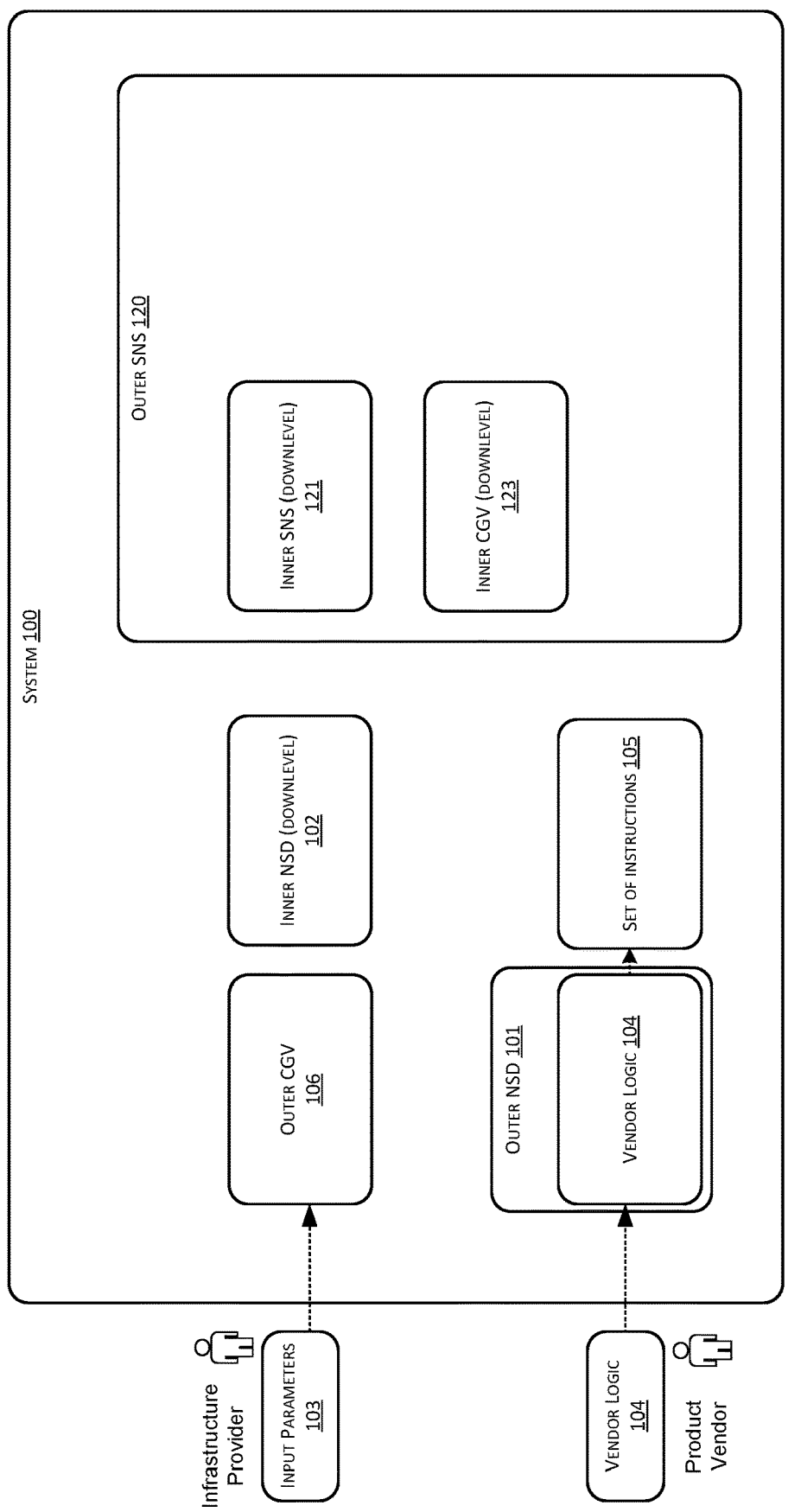
FIG. 3B illustrates a second phase of a system having a hierarchical structure to upgrade network resources based on third party vendor logic.

The state changes of this process are shown in FIGS. 3A-3D. As shown in FIG. 3A, prior to any input data indicating a modification, the system includes an existing NSD ("inner NSD downlevel 102"), an existing inner CGV ("inner CGV downlevel 123"), and an existing inner SNS ("inner SNS downlevel 121"). As shown in FIG. 3B, input parameters 103 are received at the outer CGV 106 and that is processed by the vendor logic 104 to generate a set of instructions 105. The vendor logic 104 is configured to determine the current state and generate the set of instructions 105 to transition the system from the current state shown in FIG. 3A to a desired state shown in FIG. 3D.

Figure 3C:
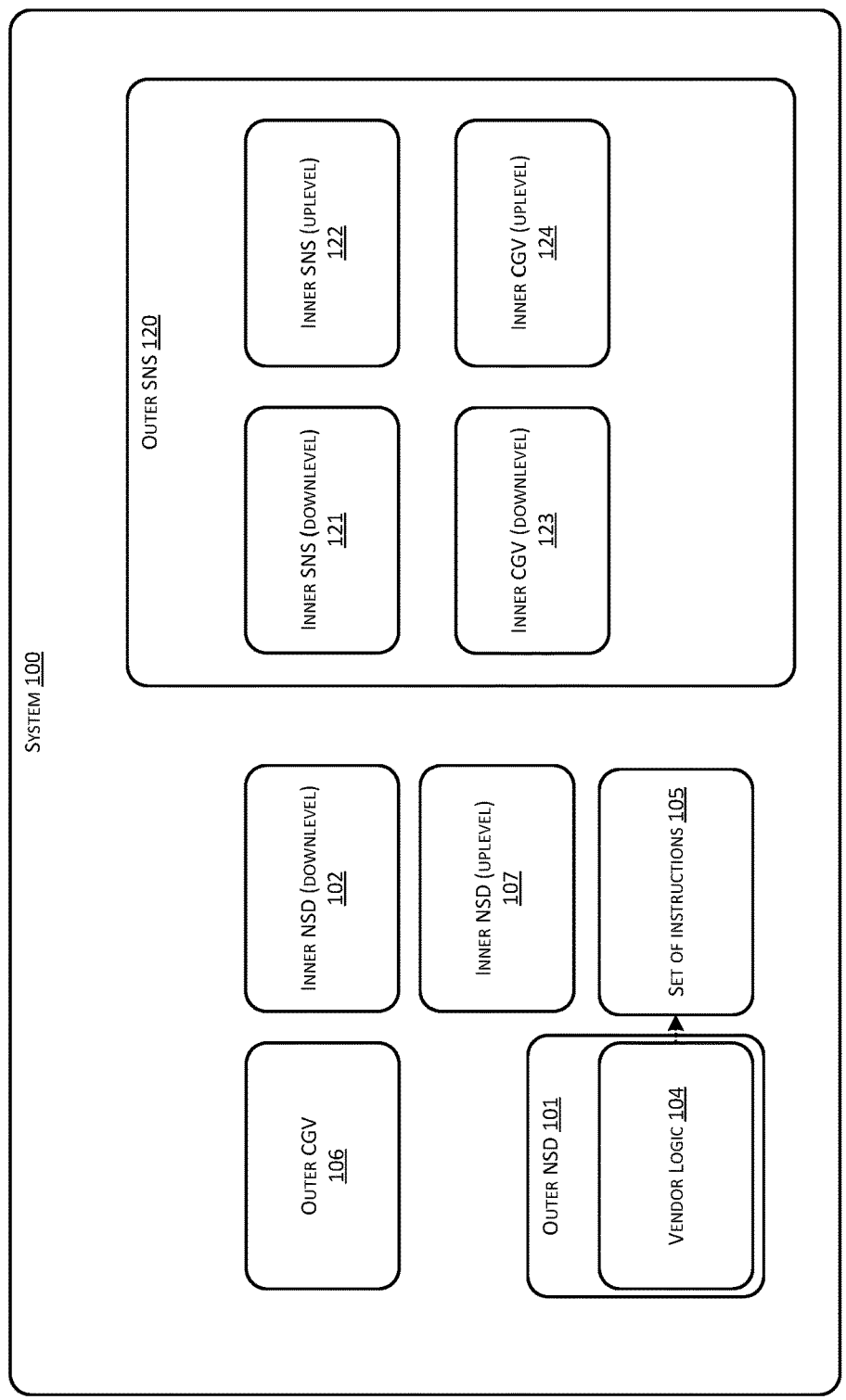
FIG. 3C illustrates a third phase of a system having a hierarchical structure to upgrade network resources based on third party vendor logic.

During execution of the set of instructions 105, the system transitions to the state shown in FIG. 3C, where the new NSD ("inner NSD uplevel 107"), the new inner SNS ("inner SNS uplevel 122") and the new inner CGV 124 ("inner CGV downlevel 123") are generated. These items are to exist and configured to be in operation in parallel with the existing NSD ("inner NSD downlevel 102"), the existing inner CGV ("inner CGV downlevel 123"), and the existing inner SNS ("inner SNS downlevel 121"). Health checks are performed on the system and if the health checks results meet one or more criteria, the system transitions to the state shown in FIG. 3D, where the system has removed the existing NSD ("inner NSD downlevel 102"), the existing inner CGV ("inner CGV downlevel 123"), and the existing inner SNS ("inner SNS downlevel 121").

The examples described above have covered different scenarios that have two different sets of operations that are handled separately: one is an upgrade, e.g., replacing a VM with a new one VM, and another one is a scaling process, e.g., a going from 4 VMs to 5 VMs. In the above-described embodiments, an outer SNS contains the logic to go from downlevel to uplevel; and another outer SNS contains the logic to scale network functions. This arrangement works well when updated config group values initiate the automation of individual categories of modifications, e.g., when a system only needs an upgrade, or when a system only needs a scaling process.

Figure 4:
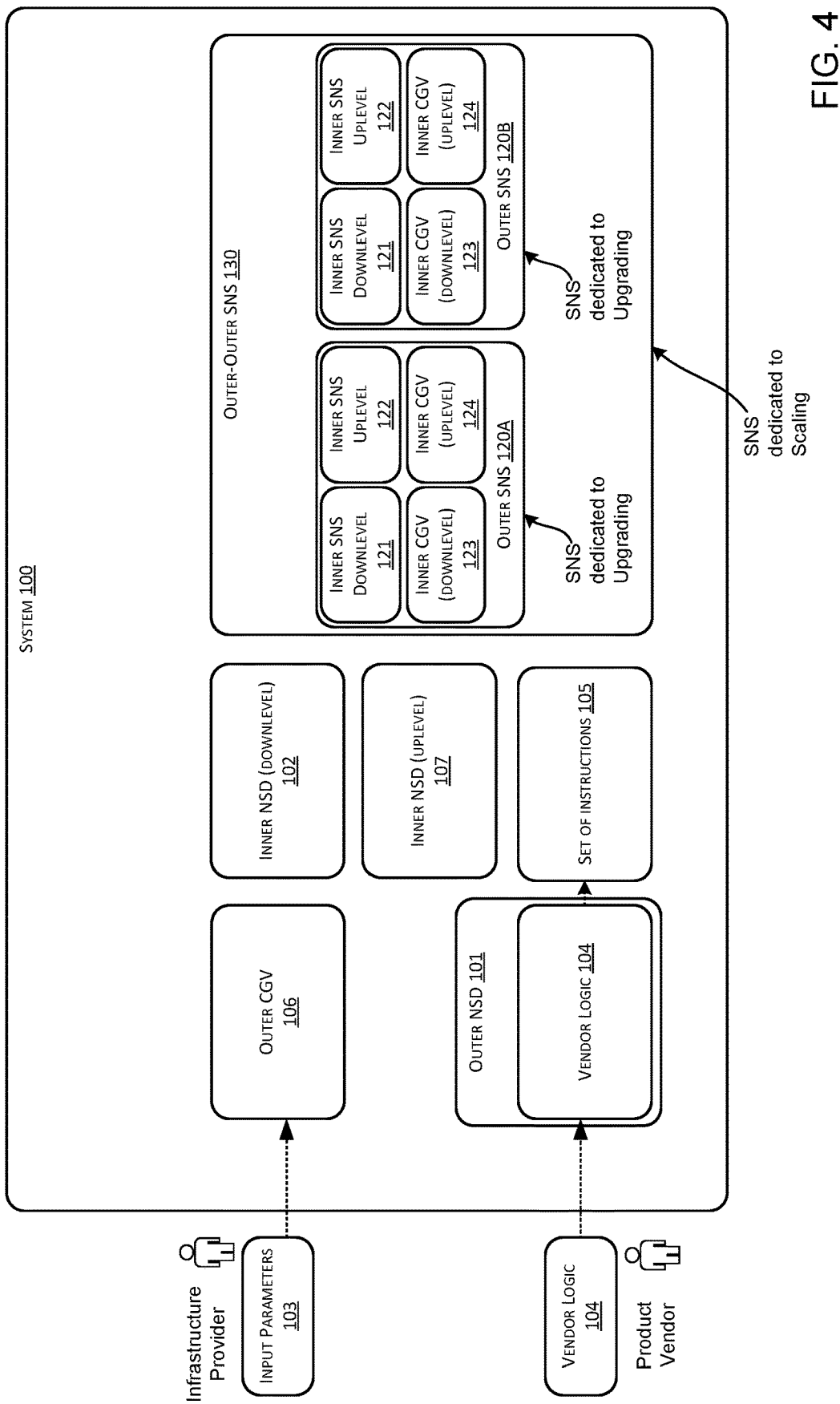
FIG. 4 illustrates an example of a system having embedded SNS layers that can use third-party vendor logic to upgrade and scale a system.

However, if the updated config group values initiate the automation of multiple categories of modifications, as shown in FIG. 4, the system can include multiple layers of an outer SNS, where each layer can be dedicated to an individual modification category. As shown, this technique uses an embedded hierarchy that can process multiple types of modifications, e.g., a scaling and upgrade process.

For illustrative purposes, consider a scenario where updated CGV includes parameters for initiating an upgrade process and a scaling process. An input can be as simple as, a desired state of the system includes two VMs (two network function instances) at version 5. If the current state has one VM at version 4, the system would determine that it would have to carry out both modifications: an upgrade process and a scaling process. If the system is already running two VMs, the system, using the logic, would determine that it would only have to run the upgrade process, and the system would not need to use the embedded layers. In such a situation, the previously described examples shown in FIGS. 1A-3D can be used.

In response to identifying two or more modification categories in the updated CGV, instead of putting all of that logic in one layer, the system generates a separate SNS layer for each modification category. In this case, the system creates embedded outer SNS layers: an outer SNS 120 and an outer-outer SNS 130. Each SNS layer can be configured to only manage one modification category. In this example, given that the CGV indicates two separate types of modifications, both a scaling process and an upgrading process, the system is configured with an (1) outer layer 120 ("outer SNS 120") that only handles the upgrade process; and (2) an outer-outer layer 130 ("outer-outer SNS 130") that only handles the scaling process.

Similar to other examples described herein, the system can utilize vendor logic 104 to process modified parameters provided to the outer CGV at the outer NSD 101. In response to receiving parameters indicating an upgrade process and a scaling process, the system uses each of the SNS layers to process each modification category. FIGS. 5A-5E shows the stages of the system in this process.

Figure 5A:
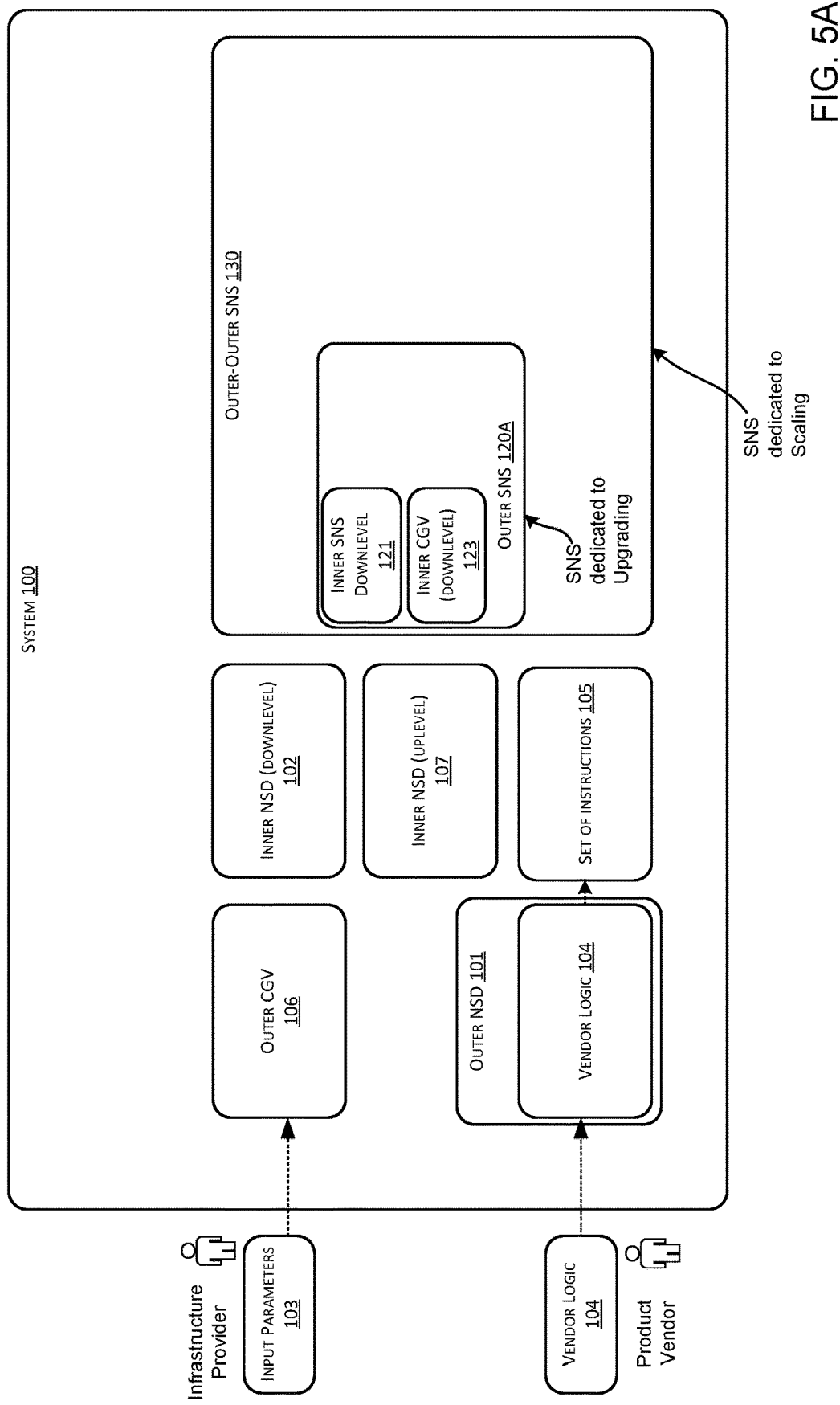
FIG. 5A illustrates a first phase of a system having an embedded hierarchical structure to scale network resources based on third party vendor logic.
Figure 5B:
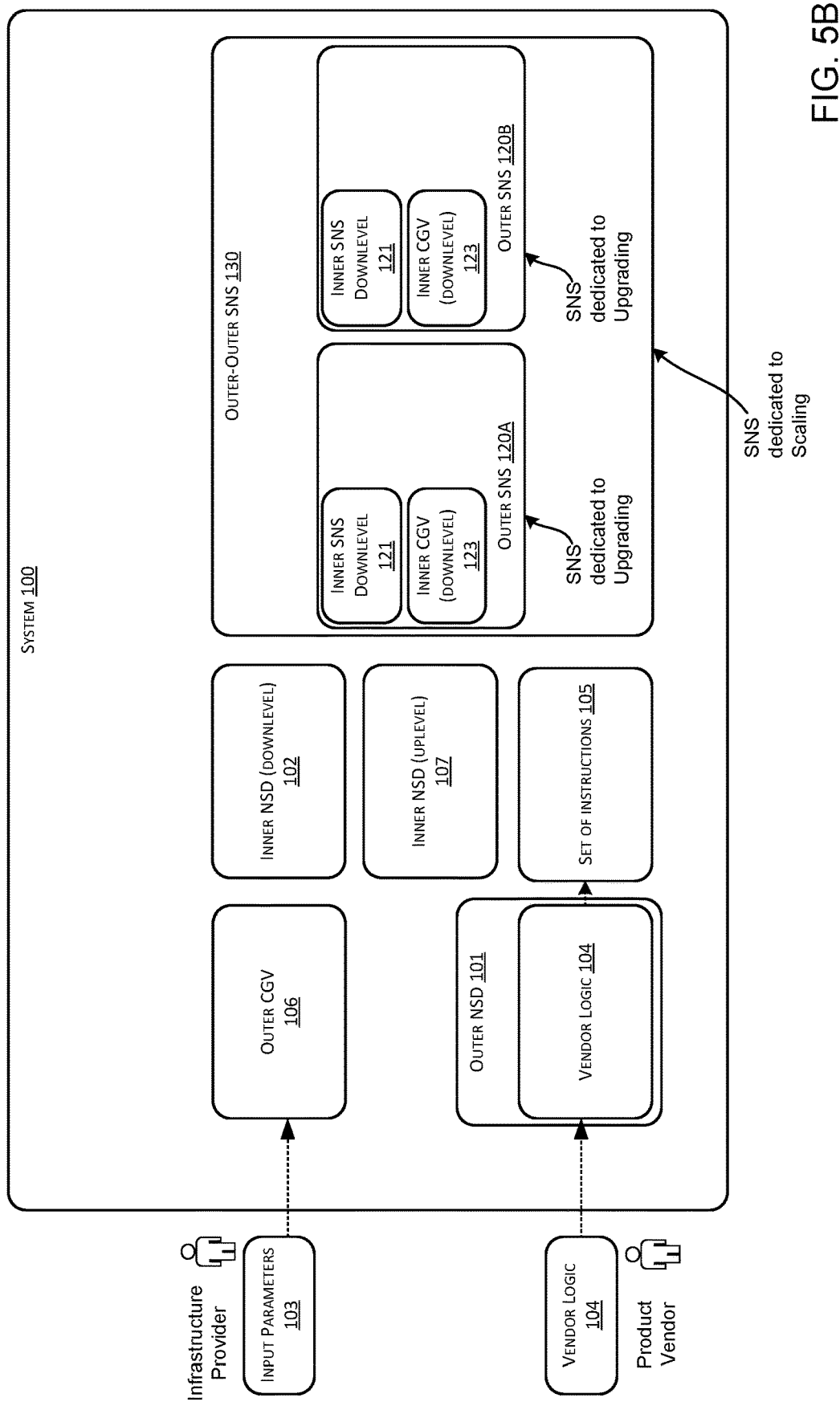
FIG. 5B illustrates a second phase of a system having an embedded hierarchical structure to scale network resources based on third party vendor logic.
Figure 5D:
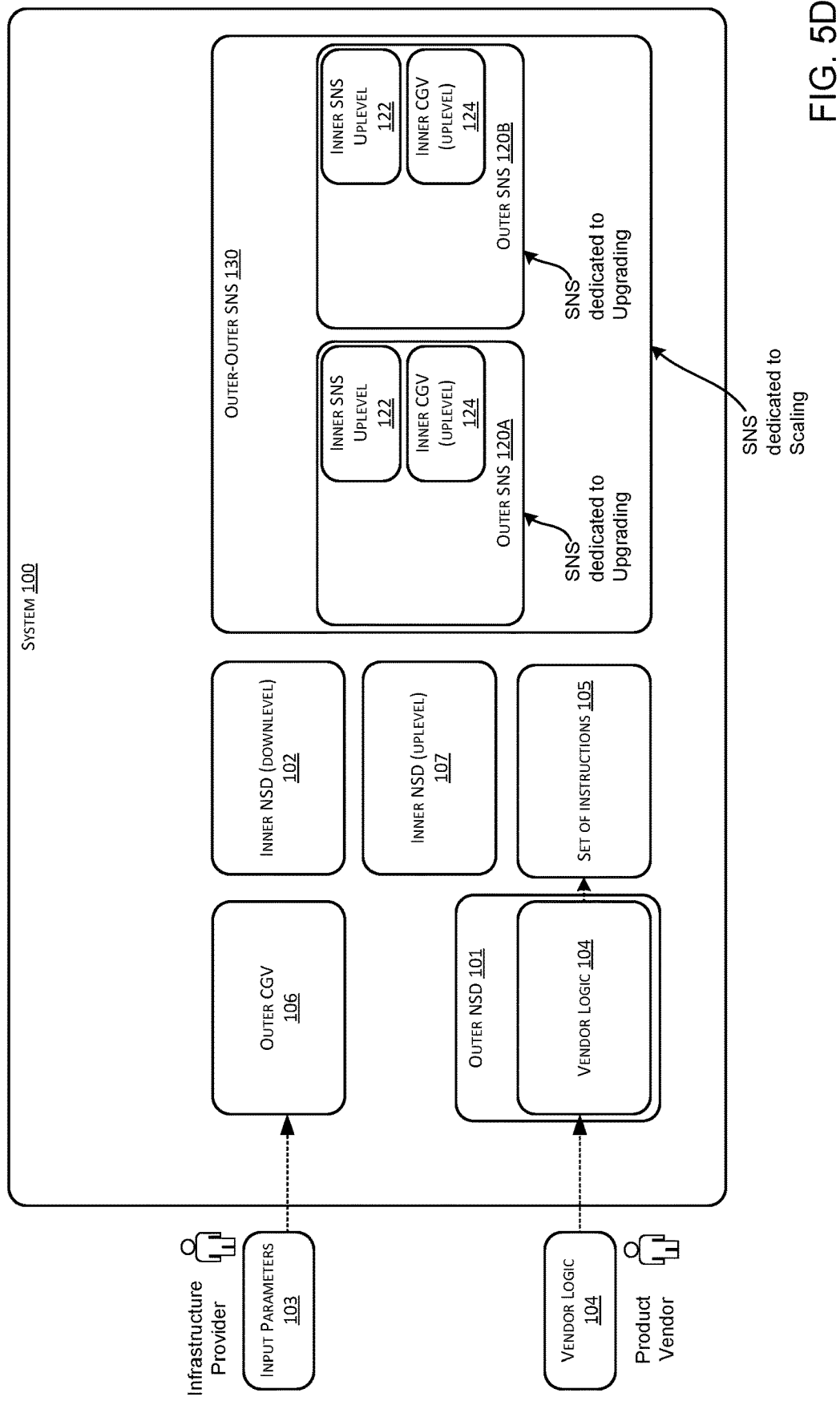
FIG. 5D illustrates a fourth phase of a system having an embedded hierarchical structure to upgrade network resources that have been scaled based on third party vendor logic.

As shown in FIG. 5A, the system starts with the original inner SNS downlevel 121 and inner CGV downlevel 123 at the outer SNS 120. In response to an input indicating the modified parameters provided to the outer CGV, the system would transition to a state shown in FIG. 5B, where the logic of the outer-outer SNS 130 generates a second instance of an outer SNS 120. As shown, the outer-outer SNS 130 comprises a first outer SNS 120A and a second outer SNS 120B. This is invoked in response to parameters indicating that the desired state is to include two instances of the network function, and other data showing that the initial state only included one instance of the network function. Since the outer-outer SNS 130 is dedicated to scaling, there are no upgrades at this stage. Each outer SNS 120 comprises an inner SNS downlevel 121 and a corresponding CGV downlevel 123.

Next, as shown in FIG. 5C, each outer SNS 120 performs the desired upgrade. In this state, each outer SNS 120 generates an inner SNS uplevel 122 and an inner CGV uplevel 124, each generated in accordance with the parameters of the CGV. These uplevel components can include, for instance, a new version of a network function, e.g., version 5. These uplevel components are also configured to coexist with the downlevel components for a period of time. Using the vendor logic, the system can then run one or more health checks on the uplevel components, e.g., each inner SNS uplevel 122. When the health checks meet one or more criteria, the system can transition to the state shown in FIG. 5D, where the system can redirect all traffic to the uplevel components and the downlevel components are removed.

An example of a health check meeting one or more criteria can include a determination that one or more performance metrics defined in the vendor logic has been satisfied. This can include performance metrics pertaining to bandwidth, response time, etc. When the performance metrics defined in the vendor logic are satisfied, the outer SNS modules can transition to the state shown in FIG. 5D.

A system having multiple inner SNS layers allows the system to build up the complexity of the automation without the need to require complex instruction sets in one place. This can also simplify the vendor logic that is required as the vendor logic can be more simplistic and modularized for specific modification categories. In the example of FIGS. 5A-5D, the other components, such as the inner NSD uplevel, inner NSD downlevel, outer NSD, and the other components can function in the same manner as the other examples described above.

Figure 6:
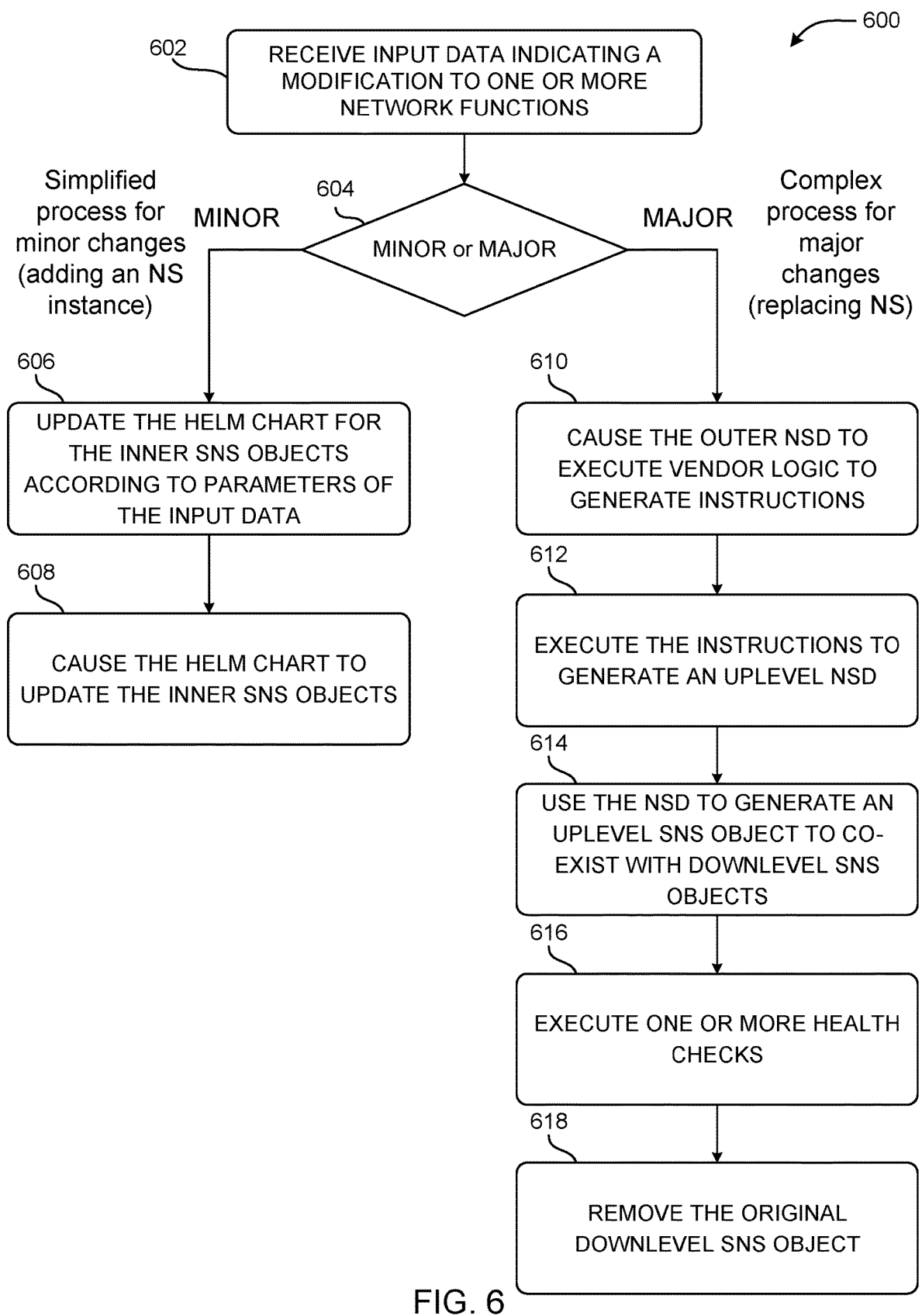
FIG. 6 is an example flow diagram showing aspects of a method implementing hierarchical SNS to simplify upgrading and scaling network resources within a system.

FIG. 6 is an example flow diagram showing aspects of a method implementing the techniques that are disclosed herein. For ease of understanding, the method discussed in this disclosure are delineated as separate operations represented as independent blocks. However, these separately delineated operations should not be construed as necessarily order dependent in their performance. The order in which the method is described is not intended to be construed as a limitation, and any number of the described blocks may be combined in any order to implement the method or an alternate method. Moreover, it is also possible that one or more of the provided operations is modified or omitted.

The particular implementation of the technologies disclosed herein is a matter of choice dependent on the performance and other requirements of a computing device. Accordingly, the logical operations described herein may be referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

As shown in FIG. 6, the routine 600 starts at operation 602, where the system receives parameters 103 defining a modification to the one or more inner SNS objects 121. The one or more inner SNS objects 121 are also referred to herein as "downlevel inner SNS objects 121." The parameters 103 are used to modify an outer CGV that is stored in association with the outer NSD 101. The parameters 103 define a desired state of the one or more inner SNS objects 121.

At operation 604, the system determines if the parameters defining the modification to the one or more inner SNS objects pertain to a minor modification or a major modification. A minor modification can include the addition to a new VM or the addition of a new container. A major modification can include a replacement of a network function such as a deployment of a new version of a VM that replaces an older version of a VM, or a deployment of a new version of a container that replaces an older version of a container.

At operation 604, if the system determines that the parameters defining the modification to the one or more inner SNS objects pertain to a minor modification, the routine 600 proceeds to block 606 where the system updates the helm chart for the inner SNS objects according to parameters of the input data. At operation 608, the updated helm charts cause the inner SNS objects to be updated such that they operate in accordance with the desired state. Based on the type of modification, e.g., a minor modification, the process uses a simple update to the helm chart to the existing inner SNS objects. This bypasses the complex steps of generating a concurrent uplevel inner SNS object and the corresponding health checks.

At operation 604, if the system determines that the parameters defining the modification to the one or more inner SNS objects pertain to a major modification, the routine 600 proceeds to block 610 where the system updates the inner NSD using the parameters defining the modification to the one or more inner SNS objects. The inner NSD is configured to change the one or more inner SNS objects in accordance with the parameters.

At operation 606, the system causes the outer NSD 101 to execute vendor logic using the parameters 103 defining the modification to the one or more inner SNS objects 121. The vendor logic uses the parameters 103 defining a desired state of the one or more inner SNS objects 121 to generate a set of instructions 105 that cause the system to transition from the initial state having the one or more inner SNS objects 121, e.g., the downlevel SNS objects, to a desired state having uplevel inner SNS objects 122 configured in accordance with the parameters 103. The set of instructions 105 are configured to cause the uplevel inner SNS 122 to concurrently exist with the one or more inner SNS objects 121 configured for the initial state of the system. As shown in FIG. 3B, the vendor logic is used to generate instructions to produce the desired state from a current state "initial state". In this process, the system identifies the current state and builds instructions to get the system to the desired state.

In some embodiments, to generate the instructions, the logic generates a query for the outer NSD to retrieve the current state of the system. This can include a call to one or more modules that provides a current state of the system, such as a database. In response to the query, the outer NSD can receive the current state of the system. The outer NSD can then generate the instructions to perform the transition to the desired state using parameters of the current state.

In some embodiments, the outer NSD queries the system to determine the current state. This can be caused by the vendor logic, which generates instructions to retrieve to the desired state. Then the instructions bring the system from the current state, e.g., the initial state, to the desired state. For example, if the desired state is 5 VMs, and there are 4 VMs in the system, the system only adds one VM based on determining that the initial state has 4 VMs. Thus, the routine can also include using the logic to generate a query for the outer NSD to retrieve the current state of the system, receiving the current state of the system, in response to the query for the outer NSD to retrieve the current state; and generating the instructions to perform the transition to the desired state using parameters of the current state.

At operation 612, the system causes execution of the set of instructions 105 to generate a uplevel inner NSD 107 that concurrently exists with a downlevel inner NSD 102, wherein the uplevel inner NSD 107 defines properties and requirements for deployment and management of for the uplevel inner SNS 122, and the downlevel inner NSD 102 defines properties and requirements for deployment and management of the one or more inner SNS objects 121 configured for the initial state of the system. An example of this process state is shown in FIG. 3C, where the execution of the set of instructions generated by the vendor logic creates an uplevel inner NSD, where the overlap with the existence of the downlevel inner NSD helps improve reliability, eliminate, and/or mitigate system outages.

At operation 614, the system causes the generation, at the outer SNS 120, of the uplevel inner SNS 122 to concurrently exist with the one or more inner SNS objects 121, e.g., the downlevel inner SNS 122, wherein the uplevel inner SNS 122 is configured to use the properties and requirements of the uplevel inner NSD 107 for maintaining operation of the system in the desired state. As shown in FIG. 3C, the system can generate the uplevel SNS to concurrently exist with the downlevel SNS the "one or more SNS objects." This concurrent existence can be for a predetermined period or phase, e.g., during the health checks. In any of the embodiments described herein, any objects that are to concurrently existence or co-exist also means that they are to concurrently operate, e.g., be available for full operation at the same time, and both objects, such as the uplevel and the downlevel inner SNS, can receive and send traffic to other objects depending on the traffic direction the configuration parameters indicate.

Operation 614 can also include generating an uplevel CGV, which is to co-exist with the downlevel CGV. Thus, the routine can also include generating an uplevel inner CGV that is to concurrently exist with a downlevel inner CGV, the uplevel inner CGV is configured to concurrently exist with the downlevel inner CGV downlevel while the uplevel inner SNS 122 and the one or more inner SNS objects 121 are concurrently operating.

At operation 616, the system runs one or more heath checks that test the uplevel inner SNS. The tests are run against criteria in the logic. This can occur while the uplevel inner SNS 122 and the one or more inner SNS objects 121 are concurrently operating. The system can determine that one or more performance parameters of the uplevel inner SNS 122 meet one or more criteria defined in the logic 104. The set of instructions 105 generated by logic 104 cause the system 100 to test one or more performance parameters of the uplevel inner SNS 122 with respect to the one or more criteria. This can include but is not limited to testing a speed, response time, a storage capacity, or any other unit of measure for any network function or design.

At operation 618, the system removes the one or more inner SNS objects 121, e.g., the downlevel inner SNS objects 121, and the downlevel NSD 102. This removal, as shown in FIG. 3D, can occur if the uplevel inner SNS is healthy. Thus, the removal can occur in response to determining that the one or more performance parameters of the uplevel inner SNS 122 meet the one or more criteria.

Operation 618 can also include the removal of the downlevel CGV when certain events are detected, such as when the system determines that the uplevel inner SNS are healthy. In such embodiments, the routine can include removing the downlevel inner CGV in response to determining that the one or more performance parameters of the uplevel inner SNS 122 meet the one or more criteria wherein the method further comprises: generating an uplevel inner CGV that is to concurrently exist with a downlevel inner CGV, the uplevel inner CGV is configured to concurrently exist with the downlevel inner CGV downlevel while the uplevel inner SNS 122 and the one or more inner SNS objects 121 are concurrently operating.

As shown in FIGS. 4 and 5A-5D, the system can include multiple inner SNS layers, e.g., an outer-outer SNS that may contain one or more the outer SNS modules. This configuration is generated when two modification categories are detected, e.g., both a scaling and an upgrade are initiated. In such embodiments, the routine can include configuring the hierarchy to further comprise an outer-outer SNS 130 that includes the outer SNS 120 in response to determining that the parameters defining the modification to the one or more inner SNS objects includes at least two modification categories, wherein the outer SNS is dedicated to managing a first category of the modification categories, and the outer-outer SNS is dedicated to managing a second category of the modification categories. The routine can also include causing the outer SNS 120 and the outer-outer SNS 130 to independently modify the one or more inner SNS objects.

In a specific embodiment where the outer-outer SNS is dedicated to scaling and the outer SNS layer is dedicated to an upgrade, the routine can include configuring the hierarchy to further comprise an outer-outer SNS 130 that includes the outer SNS 120 in response to determining that the parameters defining the modification to the one or more inner SNS objects includes at least two modification categories, wherein the outer SNS is dedicated to managing a first category modification category of upgrading the one or more inner SNS objects, and the outer-outer SNS is dedicated to managing a second modification category of scaling the one or more inner SNS objects. The routine can also include causing the outer SNS 120 to upgrade the one or more inner SNS objects independently from a process of causing the outer-outer SNS 130 to upgrade the one or more inner SNS objects. This is one example, the embodiments can also include a configuration where the functions are swapped: outer-outer SNS is used for upgrades, and the outer SNS is used for scaling.

This approach enables a system to manage network services, e.g., a collection of VMs, containers and other ARM objects that combine together to carry out tasks, is represented by an SNS object. To create an SNS the system supplies a network service design (NSD) and some declarative configuration. When an SNS is created, the system will create the VMs, containers and ARM objects that make up the network service. When an SNS object is modified then system will modify the VMs, containers and ARM objects as appropriate. The NSD will lay out how that modification must take place such that it is safe and outageless. An SNS itself is an ARM object and is therefore one of the objects that the system can deploy as part of creating a network service is another SNS. This 'lower-level' SNS can describe a subsection of the whole 'higher-level' SNS, also referred to the outer-outer and outer SNS. This in turn can be repeated and the 'lower-level' SNS can deploy an 'even-lower-level' SNS etc. These embedded layers can have as many layers as needed depending on the number of modification categories, e.g., upgrade, scaling, replacements, vendor replacement, etc.

As shown in these examples, the system can deploy the outer SNS. Then the logic will go and look at the desired state, e.g., the outer config group values, and look at the current state of the system, and determine the steps that are needed to get to the required state. The system can implement these operations by changing the configuration group values (CGV) of the inner SNS and so the process cascades down.

One aspect of the present disclosure involves the communication and use of the health status of each of the items. In some configurations, each SNS can display its health and that health data can get communicated back up the layers. For example, an outer SNS might have a health check that determines if the inner SNS is healthy. Plus, check the health of other items, and if all of those items are healthy, then the outer SNS will display as healthy. So the health status of each item can cascade up the layers.

By allowing a system to have the health checks and the convergence logic at each layer, the system is can do more than what is possible with just ARM. For example, with just ARM, a system is limited to a deploy, and then simple updates to it. There are many types of updates that are required for network functions aren't possible to do through ARM and therefore a system is required to delete an entire deployment, have an outage and then redeploy. This is obviously not a scenario that can be done for certain systems, such as systems that are part of a national infrastructure. The disclosed techniques solve this issue.

Figure 7:
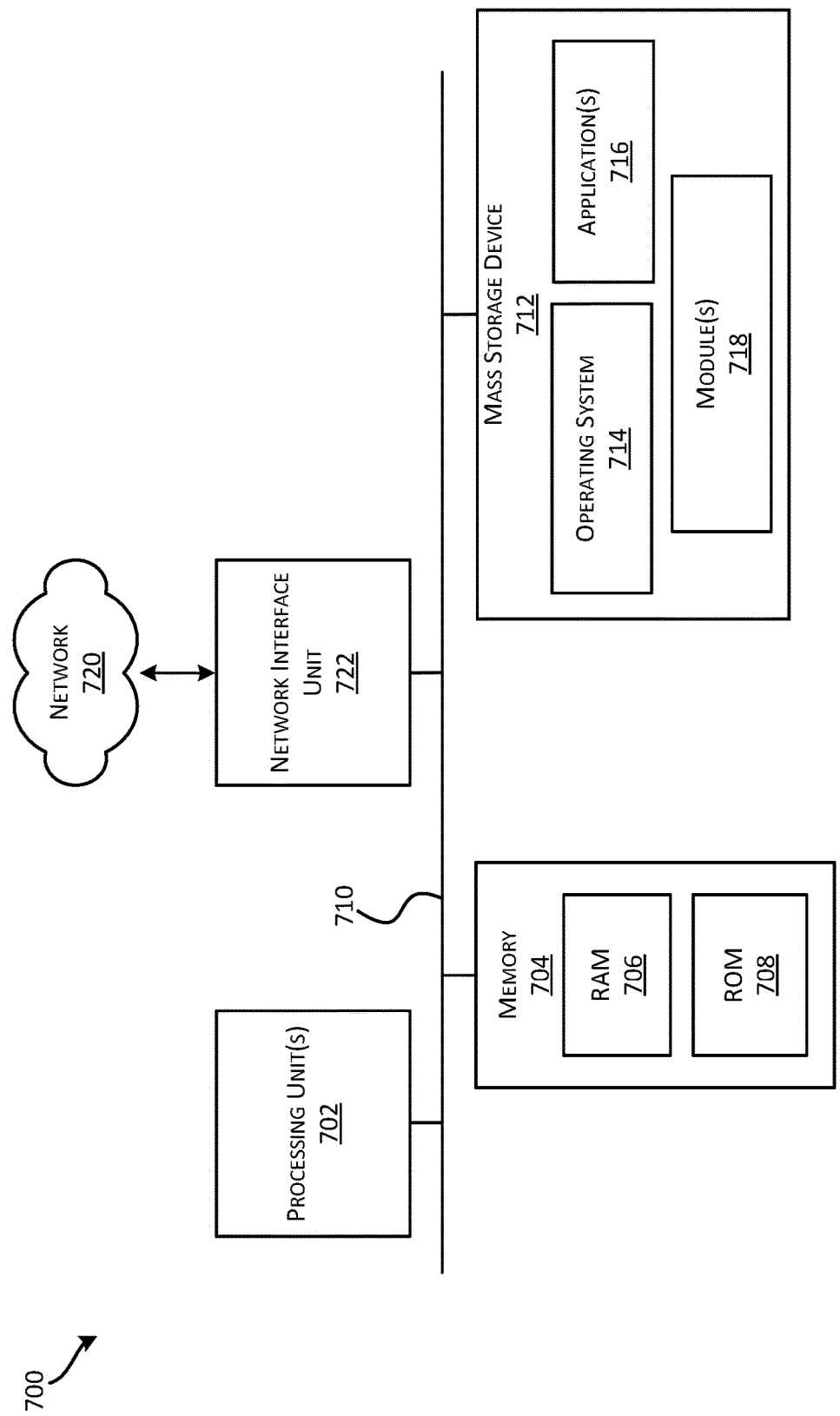
FIG. 7 is a computer architecture diagram showing an illustrative computer hardware and software architecture for a computing system capable of implementing aspects of the techniques and technologies presented herein.

FIG. 7 shows additional details of an example computer architecture 700 for a device, such as a computer or a server capable of executing computer instructions. The computer architecture 700 illustrated in FIG. 7 includes processing unit(s) 702, a system memory 704, including a random-access memory 706 (RAM) and a read-only memory (ROM) 708, and a system bus 710 that couples the memory 704 to the processing unit(s) 702. The processing units 702 may also comprise or be part of a processing system. In various examples, the processing units 702 of the processing system are distributed. Stated another way, one processing unit 702 of the processing system may be located in a first location (e.g., a rack within a datacenter) while another processing unit 702 of the processing system is located in a second location separate from the first location.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, the terms computer storage media, non-transitory storage media, computer-readable storage device, non-transitory storage device, and other variations thereof includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710.

It should be appreciated that the software components described herein may, when loaded into the processing unit(s) 702 and executed, transform the processing unit(s) 902 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

While certain example embodiments have been described, these embodiments have been presented by way of example only and are not intended to limit the scope of the inventions disclosed herein. Thus, nothing in the foregoing description is intended to imply that any particular feature, characteristic, step, component, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different datasets, two different visualizations).

The disclosure presented herein also encompasses the subject matter set forth in the following clauses:

Example Clause 1: A method for reducing outages during an upgrade of one or more inner SNS objects (121) of a system (100), the system (100) having a hierarchy comprising an outer NSD (101), an inner NSD (102), and an outer SNS (120) comprising the one or more inner SNS objects (121), the method comprising: receiving parameters (103) defining a modification to the one or more inner SNS objects (121) operating in the outer SNS (120), the parameters (103) defining a desired state of the one or more inner SNS objects (121); causing the outer NSD (101) to execute logic (104) associated with a third-party vendor to generate a set of instructions (105) to cause the system to transition from an initial state having the one or more inner SNS objects (121) to a desired state having uplevel inner SNS objects (122) configured in accordance with the parameters (103), wherein the set of instructions (105) are configured to cause the uplevel inner SNS (122) to concurrently exist with the one or more inner SNS objects (121) configured for the initial state of the system; causing execution of the set of instructions (105) to generate a uplevel inner NSD (107) that concurrently exists with a downlevel inner NSD (102), wherein the uplevel inner NSD (107) defines properties and requirements for deployment and management of for the uplevel inner SNS (122), and the downlevel inner NSD (102) defines properties and requirements for deployment and management of the one or more inner SNS objects (121) configured for the initial state of the system; generating, at the outer SNS (120), the uplevel inner SNS (122) to concurrently exist and concurrently operate with the one or more inner SNS objects (121) in the outer SNS (120), wherein the uplevel inner SNS (122) is configured using the properties and requirements of the uplevel inner NSD (107) for maintaining operation of the system in the desired state, wherein concurrent operation of the uplevel inner SNS (122) and the one or more inner SNS objects (121) in the outer SNS mitigates outages of the system; while the uplevel inner SNS (122) and the one or more inner SNS objects (121) are concurrently operating, determining that one or more performance parameters of the uplevel inner SNS (122) meet one or more criteria defined in the logic (104), wherein a test of one or more performance parameters of the uplevel inner SNS (122) with respect to the one or more criteria are controlled by the set of instructions (105) generated from the logic (104); and in response to determining that the one or more performance parameters of the uplevel inner SNS (122) meet the one or more criteria, causing the system to remove the downlevel inner NSD (102) and the one or more inner SNS objects (121), wherein the uplevel inner SNS (122) replaces the downlevel inner NSD (102) upon the removal of the downlevel inner NSD (102).

Example Clause 2: The method of Clause 1, further comprising: determining that the parameters defining the modification to the one or more inner SNS objects pertain to a minor modification; and in response to determining that the parameters defining the modification to the one or more inner SNS objects pertain to the minor modification, updating the inner NSD using the parameters defining the modification to the one or more inner SNS objects, wherein the inner NSD changes the one or more inner SNS objects in accordance with the parameters.

Example Clause 3: The method of any of the above clauses, further comprising: using the logic to generate a query for the outer NSD to retrieve the current state of the system; receiving the current state of the system at the outer NSD, in response to the query for the outer NSD to retrieve the current state; and generating the instructions to perform the transition to the desired state using parameters of the current state.

Example Clause 4: The method of any of the above clauses, further comprising: configuring the hierarchy to further comprise an outer-outer SNS (130) that includes the outer SNS (120) in response to determining that the parameters defining the modification to the one or more inner SNS objects includes at least two modification categories, wherein the outer SNS is dedicated to managing a first category of the modification categories, and the outer-outer SNS is dedicated to managing a second category of the modification categories; and causing the outer SNS (120) and the outer-outer SNS (130) to independently modify the one or more inner SNS objects.

Example Clause 5: The method of any of the above clauses, further comprising: configuring the hierarchy to further comprise an outer-outer SNS (130) that includes the outer SNS (120) in response to determining that the parameters defining the modification to the one or more inner SNS objects includes at least two modification categories, wherein the outer SNS is dedicated to managing a first category modification category of upgrading the one or more inner SNS objects, and the outer-outer SNS is dedicated to managing a second modification category of scaling the one or more inner SNS objects; and causing the outer SNS (120) to upgrade the one or more inner SNS objects independently from a process of causing the outer-outer SNS (130) to upgrade the one or more inner SNS objects.

Example Clause 6: The method of any of the above clauses, wherein the method further comprises: generating an uplevel inner CGV that is to concurrently exist with a downlevel inner CGV, the uplevel inner CGV is configured to concurrently exist with the downlevel inner CGV downlevel while the uplevel inner SNS (122) and the one or more inner SNS objects (121) are concurrently operating.

Example Clause 7: The method of clause 4, further comprising: removing the downlevel inner CGV in response to determining that the one or more performance parameters of the uplevel inner SNS (122) meet the one or more criteria wherein the method further comprises: generating an uplevel inner CGV that is to concurrently exist with a downlevel inner CGV, the uplevel inner CGV is configured to concurrently exist with the downlevel inner CGV downlevel while the uplevel inner SNS (122) and the one or more inner SNS objects (121) are concurrently operating.

Example Clause 8: A system (700) for reducing outages during an upgrade of one or more inner SNS objects (121) of a system (700), the system (100) having a hierarchy comprising an outer NSD (101), an inner NSD (102), and an outer SNS (120) comprising the one or more inner SNS objects (121), the system (100) comprising: one or more processors (702); and computer-readable storage media (704) storing instructions that, when executed by the one or more processors (702), cause the one or more processors (702) to: receive parameters (103) defining a modification to the one or more inner SNS objects (121) operating in the outer SNS (120), the parameters (103) defining a desired state of the one or more inner SNS objects (121); cause the outer NSD (101) to execute logic (104) associated with a third-party vendor to generate a set of instructions (105) to cause the system to transition from an initial state having the one or more inner SNS objects (121) to a desired state having uplevel inner SNS objects (122) configured in accordance with the parameters (103), wherein the set of instructions (105) are configured to cause the uplevel inner SNS (122) to concurrently exist with the one or more inner SNS objects (121) configured for the initial state of the system; cause execution of the set of instructions (105) to generate a uplevel inner NSD (107) that concurrently exists with a downlevel inner NSD (102), wherein the uplevel inner NSD (107) defines properties and requirements for deployment and management of for the uplevel inner SNS (122), and the downlevel inner NSD (102) defines properties and requirements for deployment and management of the one or more inner SNS objects (121) configured for the initial state of the system; generate, at the outer SNS (120), the uplevel inner SNS (122) to concurrently exist with the downlevel inner SNS (122), wherein the uplevel inner SNS (122) is configured using the properties and requirements of the uplevel inner NSD (107) for maintaining operation of the system in the desired state; while the uplevel inner SNS (122) and the one or more inner SNS objects (121) are concurrently operating, determine that one or more performance parameters of the uplevel inner SNS (122) meet one or more criteria defined in the logic (104), wherein the set of instructions (105) generated by logic (104) cause the system (100) to test one or more performance parameters of the uplevel inner SNS (122) with respect to the one or more criteria; and in response to determining that the one or more performance parameters of the uplevel inner SNS (122) meet the one or more criteria, cause the system to remove the downlevel inner NSD (102) and the downlevel inner SNS (121).

Example Clause 9: The system of Clause 8, wherein the instructions of the computer-readable storage media further cause the one or more processors to: determine that the parameters defining the modification to the one or more inner SNS objects pertain to a minor modification; and in response to determining that the parameters defining the modification to the one or more inner SNS objects pertain to the minor modification, update the inner NSD using the parameters defining the modification to the one or more inner SNS objects, wherein the inner NSD changes the one or more inner SNS objects in accordance with the parameters.

Example Clause 10: The system of any of the above clauses, wherein the instructions of the computer-readable storage media further cause the one or more processors to: use the logic to generate a query for the outer NSD to retrieve the current state of the system; receive the current state of the system at the outer NSD, in response to the query for the outer NSD to retrieve the current state; and generate the instructions to perform the transition to the desired state using parameters of the current state.

Example Clause 11: The system of any of the above clauses, wherein the instructions of the computer-readable storage media further cause the one or more processors to: configure the hierarchy to further comprise an outer-outer SNS (130) that includes the outer SNS (120) in response to determining that the parameters defining the modification to the one or more inner SNS objects includes at least two modification categories, wherein the outer SNS is dedicated to managing a first category of the modification categories, and the outer-outer SNS is dedicated to managing a second category of the modification categories; and cause the outer SNS (120) and the outer-outer SNS (130) to independently modify the one or more inner SNS objects.

Example Clause 12: The system of any of the above clauses, wherein the instructions of the computer-readable storage media further cause the one or more processors to: configure the hierarchy to further comprise an outer-outer SNS (130) that includes the outer SNS (120) in response to determining that the parameters defining the modification to the one or more inner SNS objects includes at least two modification categories, wherein the outer SNS is dedicated to managing a first category modification category of upgrading the one or more inner SNS objects, and the outer-outer SNS is dedicated to managing a second modification category of scaling the one or more inner SNS objects; and cause the outer SNS (120) to upgrade the one or more inner SNS objects independently from a process of causing the outer-outer SNS (130) to upgrade the one or more inner SNS objects.

Example Clause 13: The system of any of the above clauses, wherein the instructions of the computer-readable storage media further cause the one or more processors to: generate an uplevel inner CGV that is to concurrently exist with a downlevel inner CGV, the uplevel inner CGV is configured to concurrently exist with the downlevel inner CGV downlevel while the uplevel inner SNS (122) and the one or more inner SNS objects (121) are concurrently operating.

Example Clause 14: The system of Clause 13, wherein the instructions of the computer-readable storage media further cause the one or more processors to: remove the downlevel inner CGV in response to determining that the one or more performance parameters of the uplevel inner SNS (122) meet the one or more criteria wherein the method further comprises: generating an uplevel inner CGV that is to concurrently exist with a downlevel inner CGV, the uplevel inner CGV is configured to concurrently exist with the downlevel inner CGV downlevel while the uplevel inner SNS (122) and the one or more inner SNS objects (121) are concurrently operating.

Example Clause 15: Computer-readable storage media (704) for reducing outages during an upgrade of one or more inner SNS objects (121) of a system (700), the system (100) having a hierarchy comprising an outer NSD (101), an inner NSD (102), and an outer SNS (120) comprising the one or more inner SNS objects (121), wherein the computer-readable storage media (704) stores instructions that, when executed by a one or more processors (702) of a system (700), cause the one or more processors (702) to: receive parameters (103) defining a modification to the one or more inner SNS objects (121) operating in the outer SNS (120), the parameters (103) defining a desired state of the one or more inner SNS objects (121); cause the outer NSD (101) to execute logic (104) associated with a third-party vendor to generate a set of instructions (105) to cause the system to transition from an initial state having the one or more inner SNS objects (121) to a desired state having uplevel inner SNS objects (122) configured in accordance with the parameters (103), wherein the set of instructions (105) are configured to cause the uplevel inner SNS (122) to concurrently exist with the one or more inner SNS objects (121) configured for the initial state of the system; cause execution of the set of instructions (105) to generate a uplevel inner NSD (107) that concurrently exists with a downlevel inner NSD (102), wherein the uplevel inner NSD (107) defines properties and requirements for deployment and management of for the uplevel inner SNS (122), and the downlevel inner NSD (102) defines properties and requirements for deployment and management of the one or more inner SNS objects (121) configured for the initial state of the system; generate, at the outer SNS (120), the uplevel inner SNS (122) to concurrently exist with the downlevel inner SNS (122), wherein the uplevel inner SNS (122) is configured using the properties and requirements of the uplevel inner NSD (107) for maintaining operation of the system in the desired state; while the uplevel inner SNS (122) and the one or more inner SNS objects (121) are concurrently operating, determine that one or more performance parameters of the uplevel inner SNS (122) meet one or more criteria defined in the logic (104), wherein the set of instructions (105) generated by logic (104) cause the system (100) to test one or more performance parameters of the uplevel inner SNS (122) with respect to the one or more criteria; and in response to determining that the one or more performance parameters of the uplevel inner SNS (122) meet the one or more criteria, cause the system to remove the downlevel inner NSD (102) and the downlevel inner SNS (121).

Example Clause 16: The computer-readable storage media system of Clause 15, wherein the instructions of the computer-readable storage media further cause the one or more processors to: determine that the parameters defining the modification to the one or more inner SNS objects pertain to a minor modification; and in response to determining that the parameters defining the modification to the one or more inner SNS objects pertain to the minor modification, update the inner NSD using the parameters defining the modification to the one or more inner SNS objects, wherein the inner NSD changes the one or more inner SNS objects in accordance with the parameters.

Example Clause 17: The computer-readable storage media system of any of the above clauses, wherein the instructions of the computer-readable storage media further cause the one or more processors to: use the logic to generate a query for the outer NSD to retrieve the current state of the system; receive the current state of the system at the outer NSD, in response to the query for the outer NSD to retrieve the current state; and generate the instructions to perform the transition to the desired state using parameters of the current state.

Example Clause 18: The computer-readable storage media system of any of the above clauses, wherein the instructions of the computer-readable storage media further cause the one or more processors to: configure the hierarchy to further comprise an outer-outer SNS (130) that includes the outer SNS (120) in response to determining that the parameters defining the modification to the one or more inner SNS objects includes at least two modification categories, wherein the outer SNS is dedicated to managing a first category of the modification categories, and the outer-outer SNS is dedicated to managing a second category of the modification categories; and cause the outer SNS (120) and the outer-outer SNS (130) to independently modify the one or more inner SNS objects.

Example Clause 19: The computer-readable storage media system of any of the above clauses, wherein the instructions of the computer-readable storage media further cause the one or more processors to: configure the hierarchy to further comprise an outer-outer SNS (130) that includes the outer SNS (120) in response to determining that the parameters defining the modification to the one or more inner SNS objects includes at least two modification categories, wherein the outer SNS is dedicated to managing a first category modification category of upgrading the one or more inner SNS objects, and the outer-outer SNS is dedicated to managing a second modification category of scaling the one or more inner SNS objects; and cause the outer SNS (120) to upgrade the one or more inner SNS objects independently from a process of causing the outer-outer SNS (130) to upgrade the one or more inner SNS objects.

Example Clause 20: The computer-readable storage media system of any of the above clauses, wherein the instructions of the computer-readable storage media further cause the one or more processors to: generate an uplevel inner CGV that is to concurrently exist with a downlevel inner CGV, the uplevel inner CGV is configured to concurrently exist with the downlevel inner CGV downlevel while the uplevel inner SNS (122) and the one or more inner SNS objects (121) are concurrently operating.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method for reducing outages during an upgrade of one or more inner SNS objects of a system, the system having a hierarchy comprising an outer NSD, an inner NSD, and an outer SNS comprising the one or more inner SNS objects, the method comprising:
   receiving parameters defining a modification to the one or more inner SNS objects operating in the outer SNS, the parameters defining a desired state of the one or more inner SNS objects;
   causing the outer NSD to execute logic associated with a third-party vendor to generate a set of instructions to cause the system to transition from an initial state having the one or more inner SNS objects to a desired state having uplevel inner SNS objects configured in accordance with the parameters, wherein the set of instructions are configured to cause the uplevel inner SNS to concurrently exist with the one or more inner SNS objects configured for the initial state of the system;
   causing execution of the set of instructions to generate a uplevel inner NSD that concurrently exists with a downlevel inner NSD, wherein the uplevel inner NSD defines properties and requirements for deployment and management of for the uplevel inner SNS, and the downlevel inner NSD defines properties and requirements for deployment and management of the one or more inner SNS objects configured for the initial state of the system;
   generating, at the outer SNS, the uplevel inner SNS to concurrently exist and concurrently operate with the one or more inner SNS objects in the outer SNS, wherein the uplevel inner SNS is configured using the properties and requirements of the uplevel inner NSD for maintaining operation of the system in the desired state, wherein concurrent operation of the uplevel inner SNS and the one or more inner SNS objects in the outer SNS mitigates reduces outages of the system;
   while the uplevel inner SNS and the one or more inner SNS objects are concurrently operating, determining that one or more performance parameters of the uplevel inner SNS meet one or more criteria defined in the logic, wherein a test of one or more performance parameters of the uplevel inner SNS with respect to the one or more criteria are controlled by the set of instructions generated from the logic; and
   in response to determining that the one or more performance parameters of the uplevel inner SNS meet the one or more criteria, causing the system to remove the downlevel inner NSD and the one or more inner SNS objects, wherein the uplevel inner SNS replaces the downlevel inner NSD upon the removal of the downlevel inner NSD.

2. The method of claim 1, further comprising:
   determining that the parameters defining the modification to the one or more inner SNS objects pertain to a predetermined category of modifications; and
   in response to determining that the parameters defining the modification to the one or more inner SNS objects pertain to the predetermined category of modifications, updating the inner NSD using the parameters defining the modification to the one or more inner SNS objects, wherein the inner NSD changes the one or more inner SNS objects in accordance with the parameters.

3. The method of claim 1, further comprising:
   using the logic to generate a query for the outer NSD to retrieve the current state of the system;
   receiving the current state of the system at the outer NSD, in response to the query for the outer NSD to retrieve the current state; and
   generating the instructions to perform the transition to the desired state using parameters of the current state.

4. The method of claim 1, further comprising:
   configuring the hierarchy to further comprise an outer-outer SNS that includes the outer SNS in response to determining that the parameters defining the modification to the one or more inner SNS objects includes at least two modification categories, wherein the outer SNS is dedicated to managing a first category of the modification categories, and the outer-outer SNS is dedicated to managing a second category of the modification categories; and
   causing the outer SNS and the outer-outer SNS to independently modify the one or more inner SNS objects.

5. The method of claim 4, further comprising: removing the downlevel inner CGV in response to determining that the one or more performance parameters of the uplevel inner SNS meet the one or more criteria wherein the method further comprises: generating an uplevel inner CGV that is to concurrently exist with a downlevel inner CGV, the uplevel inner CGV is configured to concurrently exist with the downlevel inner CGV downlevel while the uplevel inner SNS and the one or more inner SNS objects are concurrently operating.

6. The method of claim 1, further comprising:
   configuring the hierarchy to further comprise an outer-outer SNS that includes the outer SNS in response to determining that the parameters defining the modification to the one or more inner SNS objects includes at least two modification categories, wherein the outer SNS is dedicated to managing a first category modification category of upgrading the one or more inner SNS objects, and the outer-outer SNS is dedicated to managing a second modification category of scaling the one or more inner SNS objects; and causing the outer SNS to upgrade the one or more inner SNS objects independently from a process of causing the outer-outer SNS to upgrade the one or more inner SNS objects.

7. The method of claim 1, wherein the method further comprises: generating an uplevel inner CGV that is to concurrently exist with a downlevel inner CGV, the uplevel inner CGV is configured to concurrently exist with the downlevel inner CGV downlevel while the uplevel inner SNS and the one or more inner SNS objects are concurrently operating.

8. A system for reducing outages during an upgrade of one or more inner SNS objects of a system, the system having a hierarchy comprising an outer NSD, an inner NSD, and an outer SNS comprising the one or more inner SNS objects, the system comprising:
one or more processors; and
computer-readable storage media storing instructions that, when executed by the one or more processors, cause the one or more processors to:
receive parameters defining a modification to the one or more inner SNS objects operating in the outer SNS, the parameters defining a desired state of the one or more inner SNS objects;
cause the outer NSD to execute logic associated with a third-party vendor to generate a set of instructions to cause the system to transition from an initial state having the one or more inner SNS objects to a desired state having uplevel inner SNS objects configured in accordance with the parameters, wherein the set of instructions are configured to cause the uplevel inner SNS to concurrently exist with the one or more inner SNS objects configured for the initial state of the system;
cause execution of the set of instructions to generate a uplevel inner NSD that concurrently exists with a downlevel inner NSD, wherein the uplevel inner NSD defines properties and requirements for deployment and management of for the uplevel inner SNS, and the downlevel inner NSD defines properties and requirements for deployment and management of the one or more inner SNS objects configured for the initial state of the system;
generate, at the outer SNS, the uplevel inner SNS to concurrently exist with the downlevel inner SNS, wherein the uplevel inner SNS is configured using the properties and requirements of the uplevel inner NSD for maintaining operation of the system in the desired state;
while the uplevel inner SNS and the one or more inner SNS objects are concurrently operating, determine that one or more performance parameters of the uplevel inner SNS meet one or more criteria defined in the logic, wherein the set of instructions generated by logic cause the system to test one or more performance parameters of the uplevel inner SNS with respect to the one or more criteria; and
in response to determining that the one or more performance parameters of the uplevel inner SNS meet the one or more criteria, cause the system to remove the downlevel inner NSD and the downlevel inner SNS.

9. The system of claim 8, wherein the instructions of the computer-readable storage media further cause the one or more processors to:
determine that the parameters defining the modification to the one or more inner SNS objects pertain to a predetermined category of modifications; and
in response to determining that the parameters defining the modification to the one or more inner SNS objects pertain to the predetermined category of modifications, update the inner NSD using the parameters defining the modification to the one or more inner SNS objects, wherein the inner NSD changes the one or more inner SNS objects in accordance with the parameters.

10. The system of claim 8, wherein the instructions of the computer-readable storage media further cause the one or more processors to:
use the logic to generate a query for the outer NSD to retrieve the current state of the system;
receive the current state of the system at the outer NSD, in response to the query for the outer NSD to retrieve the current state; and
generate the instructions to perform the transition to the desired state using parameters of the current state.

11. The system of claim 8, wherein the instructions of the computer-readable storage media further cause the one or more processors to:
configure the hierarchy to further comprise an outer-outer SNS that includes the outer SNS in response to determining that the parameters defining the modification to the one or more inner SNS objects includes at least two modification categories, wherein the outer SNS is dedicated to managing a first category of the modification categories, and the outer-outer SNS is dedicated to managing a second category of the modification categories; and
cause the outer SNS and the outer-outer SNS to independently modify the one or more inner SNS objects.

12. The system of claim 8, wherein the instructions of the computer-readable storage media further cause the one or more processors to:
configure the hierarchy to further comprise an outer-outer SNS that includes the outer SNS in response to determining that the parameters defining the modification to the one or more inner SNS objects includes at least two modification categories, wherein the outer SNS is dedicated to managing a first category modification category of upgrading the one or more inner SNS objects, and the outer-outer SNS is dedicated to managing a second modification category of scaling the one or more inner SNS objects; and
cause the outer SNS to upgrade the one or more inner SNS objects independently from a process of causing the outer-outer SNS to upgrade the one or more inner SNS objects.

13. The system of claim 8, wherein the instructions of the computer-readable storage media further cause the one or more processors to: generate an uplevel inner CGV that is to concurrently exist with a downlevel inner CGV, the uplevel inner CGV is configured to concurrently exist with the downlevel inner CGV downlevel while the uplevel inner SNS and the one or more inner SNS objects are concurrently operating.

14. The system of claim 13, wherein the instructions of the computer-readable storage media further cause the one or more processors to: remove the downlevel inner CGV in response to determining that the one or more performance parameters of the uplevel inner SNS meet the one or more criteria wherein the method further comprises: generating an uplevel inner CGV that is to concurrently exist with a downlevel inner CGV, the uplevel inner CGV is configured to concurrently exist with the downlevel inner CGV downlevel while the uplevel inner SNS and the one or more inner SNS objects are concurrently operating.

15. Computer-readable storage device for reducing outages during an upgrade of one or more inner SNS objects of a system, the system having a hierarchy comprising an outer NSD, an inner NSD, and an outer SNS comprising the one or more inner NSD objects, wherein the computer-readable storage device stores instructions that, when executed by a one or more processors of a system, cause the one or more processors to:
receive parameters defining a modification to the one or more inner SNS objects operating in the outer SNS, the parameters defining a desired state of the one or more inner SNS objects;
cause the outer NSD to execute logic associated with a third-party vendor to generate a set of instructions to cause the system to transition from an initial state having the one or more inner SNS objects to a desired state having uplevel inner SNS objects configured in accordance with the parameters, wherein the set of instructions are configured to cause the uplevel inner SNS to concurrently exist with the one or more inner SNS objects configured for the initial state of the system;
cause execution of the set of instructions to generate a uplevel inner NSD that concurrently exists with a downlevel inner NSD, wherein the uplevel inner NSD defines properties and requirements for deployment and management of for the uplevel inner SNS, and the downlevel inner NSD defines properties and requirements for deployment and management of the one or more inner SNS objects configured for the initial state of the system;
generate, at the outer SNS, the uplevel inner SNS to concurrently exist with the downlevel inner SNS, wherein the uplevel inner SNS is configured using the properties and requirements of the uplevel inner NSD for maintaining operation of the system in the desired state;
while the uplevel inner SNS and the one or more inner SNS objects are concurrently operating, determine that one or more performance parameters of the uplevel inner SNS meet one or more criteria defined in the logic, wherein the set of instructions generated by logic cause the system to test one or more performance parameters of the uplevel inner SNS with respect to the one or more criteria; and
in response to determining that the one or more performance parameters of the uplevel inner SNS meet the one or more criteria, cause the system to remove the downlevel inner NSD and the downlevel inner SNS.

16. The computer-readable storage device of claim 15, wherein the instructions of the computer-readable storage device further cause the one or more processors to:
determine that the parameters defining the modification to the one or more inner SNS objects pertain to a predetermined category of modifications; and
in response to determining that the parameters defining the modification to the one or more inner SNS objects pertain to the predetermined category of modifications, update the inner NSD using the parameters defining the modification to the one or more inner SNS objects, wherein the inner NSD changes the one or more inner SNS objects in accordance with the parameters.

17. The computer-readable storage device of claim 15, wherein the instructions of the computer-readable storage device further cause the one or more processors to:
use the logic to generate a query for the outer NSD to retrieve the current state of the system;
receive the current state of the system at the outer NSD, in response to the query for the outer NSD to retrieve the current state; and
generate the instructions to perform the transition to the desired state using parameters of the current state.

18. The computer-readable storage device of claim 15, wherein the instructions of the computer-readable storage device further cause the one or more processors to:
configure the hierarchy to further comprise an outer-outer SNS that includes the outer SNS in response to determining that the parameters defining the modification to the one or more inner SNS objects includes at least two modification categories, wherein the outer SNS is dedicated to managing a first category of the modification categories, and the outer-outer SNS is dedicated to managing a second category of the modification categories; and
cause the outer SNS and the outer-outer SNS to independently modify the one or more inner SNS objects.

19. The computer-readable storage device of claim 15, wherein the instructions of the computer-readable storage device further cause the one or more processors to:
configure the hierarchy to further comprise an outer-outer SNS that includes the outer SNS in response to determining that the parameters defining the modification to the one or more inner SNS objects includes at least two modification categories, wherein the outer SNS is dedicated to managing a first category modification category of upgrading the one or more inner SNS objects, and the outer-outer SNS is dedicated to managing a second modification category of scaling the one or more inner SNS objects; and
cause the outer SNS to upgrade the one or more inner SNS objects independently from a process of causing the outer-outer SNS to upgrade the one or more inner SNS objects.

20. The computer-readable storage device of claim 15, wherein the instructions of the computer-readable storage device further cause the one or more processors to: generate an uplevel inner CGV that is to concurrently exist with a downlevel inner CGV, the uplevel inner CGV is configured to concurrently exist with the downlevel inner CGV downlevel while the uplevel inner SNS and the one or more inner SNS objects are concurrently operating.

* * * * *